(12) United States Patent
Tanigawa et al.

(10) Patent No.: US 8,941,912 B2
(45) Date of Patent: Jan. 27, 2015

(54) YTTERBIUM-DOPED OPTICAL FIBER, FIBER LASER AND FIBER AMPLIFIER

(75) Inventors: Shoji Tanigawa, Sakura (JP); Teruno Nakaguma, Sakura (JP); Tomofumi Arai, Sakura (JP); Kentaro Ichii, Sakura (JP)

(73) Assignee: Fujikura Ltd., Tokyo (JP)

( * ) Notice: Subject to any disclaimer, the term of this patent is extended or adjusted under 35 U.S.C. 154(b) by 231 days.

(21) Appl. No.: 13/020,604

(22) Filed: Feb. 3, 2011

(65) Prior Publication Data

US 2011/0142083 A1 Jun. 16, 2011

Related U.S. Application Data

(63) Continuation of application No. PCT/JP2009/003728, filed on Aug. 4, 2009.

(30) Foreign Application Priority Data

Aug. 4, 2008 (JP) ................................. 2008-201171
Feb. 19, 2009 (WO) .................. PCT/JP2009/052906

(51) Int. Cl.
*H04B 10/17* (2006.01)
*G02B 6/036* (2006.01)
(Continued)

(52) U.S. Cl.
CPC ................ *G02B 6/02* (2013.01); *C03C 13/046* (2013.01); *G02B 6/024* (2013.01); *G02B 6/0285* (2013.01); *G02B 6/03611* (2013.01); *G02B 6/03633* (2013.01); *G02B 6/03638* (2013.01); *G02B 6/03644* (2013.01); *G02B 6/0365* (2013.01);
(Continued)

(58) Field of Classification Search
CPC ..................................................... H01S 3/06716
USPC ............. 359/341.1, 341.5; 385/123, 126, 127
See application file for complete search history.

(56) References Cited

U.S. PATENT DOCUMENTS 6,411,762 B1 * 6/2002 Anthon et al. ................. 385/123
6,603,598 B1 * 8/2003 Oliveti et al. ............... 359/341.5
(Continued)

FOREIGN PATENT DOCUMENTS

JP    1-298043 A   12/1989
JP    9-194225 A    7/1997
(Continued)

OTHER PUBLICATIONS

A. V. Shubin, M. V. Yashkov, M. A. Melkumov, S. A. Smirnow, I. A. Bufetov, and E. M. Dianov, "Photodarkening of aluminosilicate and phosphosilicate Yb-doped fibers," in Conf. Digest of CLEO Europe—EQEC 2007, CJ3-1-THU (2007).*
(Continued)

Primary Examiner — Eric Bolda
(74) Attorney, Agent, or Firm — Sughrue Mion, PLLC

(57) ABSTRACT

An ytterbium-doped optical fiber includes: a core which contains at least ytterbium, aluminum, and phosphorus; and a cladding which encircles the core, wherein an aluminum oxide equivalent concentration of the aluminum in the core is 0.2 mol % or more, a diphosphorus pentaoxide equivalent concentration of the phosphorus is higher than the aluminum oxide equivalent concentration, and the core either does not contain germanium or contains less than 1.1 mol % of germanium in a germanium dioxide equivalent concentration.

13 Claims, 12 Drawing Sheets

(51) Int. Cl.
*G02B 6/02* (2006.01)
*C03C 13/04* (2006.01)
*G02B 6/024* (2006.01)
*G02B 6/028* (2006.01)
*H01S 3/067* (2006.01)
*H01S 3/16* (2006.01)

(52) U.S. Cl.
CPC ......... *G02B 6/03661* (2013.01); *H01S 3/06708* (2013.01); *H01S 3/06716* (2013.01); *H01S 3/0672* (2013.01); *H01S 3/06729* (2013.01); *H01S 3/06737* (2013.01); *H01S 3/1618* (2013.01); *H01S 3/1691* (2013.01); *H01S 3/1693* (2013.01)
USPC ...................... 359/341.5; 359/341.1; 385/127

(56) References Cited

U.S. PATENT DOCUMENTS

| | | | | |
|---|---|---|---|---|
| 6,636,347 | B1* | 10/2003 | Wang et al. | 359/341.5 |
| 7,006,752 | B2* | 2/2006 | Dragic | 385/142 |
| 7,079,749 | B2* | 7/2006 | Dragic | 385/142 |
| 7,221,840 | B2* | 5/2007 | Vienne et al. | 385/126 |
| 2002/0114600 | A1* | 8/2002 | Aiso et al. | 385/123 |
| 2003/0142395 | A1 | 7/2003 | MacCormack et al. | |
| 2005/0213908 | A1* | 9/2005 | Dragic | 385/124 |
| 2009/0011233 | A1* | 1/2009 | Morasse et al. | 428/375 |
| 2009/0016387 | A1* | 1/2009 | Durkin et al. | 372/25 |

FOREIGN PATENT DOCUMENTS

| | | |
|---|---|---|
| JP | 11-112070 A | 4/1999 |
| JP | 2002-43660 A | 2/2002 |
| JP | 2003-124547 A | 4/2003 |
| JP | 2006-519495 A | 8/2006 |
| JP | 2007-114335 A | 5/2007 |
| WO | 2004/070431 A2 | 8/2004 |
| WO | 2008/061530 A1 | 5/2008 |

OTHER PUBLICATIONS

International Search Report (PCT/ISA/210) dated Sep. 1, 2009, issued by the International Searching Authority in corresponding PCT Application No. PCT/JP2009/003728.

International Search Report (PCT/ISA/210) dated Mar. 17, 2009, issued by the International Searching Authority in corresponding PCT Application No. PCT/JP2009/052906.

Digiovannia et al., "Structure and Properties of Silica Containing Aluminum and Phosphorus Near the AlPO4 Join," Journal of Non-Crystalline Solids, Nov. 2, 1989, vol. 113, Issue 1, pp. 58-64.

Tammela, et al., "The Potential of Direct Nanoparticle Deposition for the Next Generation of Optical Fibers," The Proceedings of SPIE Photonics West, 2006, 9 pages, vol. 6116-16.

T. Kitabayashi, "Population Inversion Factor Dependence of Photodarkening of Yb-dobed Fibers and it Suppression by Highly Aluminum Doping," The Proceedings of OFC 2006, OThC5, 2006, 3 pages.

* cited by examiner

YTTERBIUM-DOPED OPTICAL FIBER, FIBER LASER AND FIBER AMPLIFIER

CROSS-REFERENCE TO RELATED APPLICATION

This is a Continuation Application of International Application No. PCT/JP2009/003728, filed on Aug. 4, 2009, which claims priority to Japanese Patent Application No. 2008-201171, filed Aug. 4, 2008, and International Patent Application No. PCT/JP2009/052906, filed Feb. 19, 2009 in Japan. The contents of the aforementioned applications are incorporated herein by reference.

TECHNICAL FIELD

The present invention relates to an ytterbium-doped optical fiber in which photodarkening has been suppressed, and to a fiber laser and a fiber amplifier which are provided with this optical fiber.

BACKGROUND ART

An amplifying optical fiber having an axially symmetric waveguide structure in which a core and/or a cladding has been doped with rare earth elements are used as optically-active media of fiber amplifiers and fiber lasers. In particular, Yb-doped optical fibers which contain ytterbium (Yb) as the rare earth element can obtain high-power output light with excellent beam quality. The oscillation wavelength of this output light is the wavelength around 1 µm which is substantially the same as Nd—YAG laser which is a conventional type of existing high output laser. Because of this, practical applications of Yb-doped fiber lasers as a high output light source laser medium are expected to be material processing such as welding, marking, cutting and the like.

FIG. 12 shows an example of a cross section in the radial direction of a conventional Yb-doped optical fiber and of the refractive index profile thereof.

An Yb-doped optical fiber 110 shown here is a single cladding fiber in which cladding 112 is provided on an outer circumference of a core 111, and a protective coating layer 113 is provided on an outer circumference of the cladding 112. In this Yb-doped optical fiber 110, the refractive index of the core 111 is higher than the refractive index of the cladding 112, in order for guided lights to be confined. Normally, a refractive index-raising dopant such as germanium (Ge), aluminum (Al), or phosphorus (P) is doped into the core 111, in order to raise the refractive index of the core 111. Furthermore, the core 111 is also doped with a dopant Yb which has an optical amplifying function. Yb is normally doped into the core 111 so as to have a substantially uniform density distribution. However, it is acceptable if there is some density distribution and it is also possible for a portion of the cladding 112 to be doped.

A high-power signal light can be obtained by making pumping light incident on this Yb-doped optical fiber and then making signal light incident thereon, or by making pumping light incident on this Yb-doped optical fiber and then consisting cavities using a fiber Bragg grating.

Normally, when an Yb-doped optical fiber is used as an optical amplifying medium in a fiber laser or fiber amplifier, the Yb-doped optical fiber is mostly used in an effectively single-mode condition in order to utilize the advantages of a fiber-type optical amplifying medium, namely, the ability to realize restricted propagating condition together with excellent cooling efficiency to be utilized.

The conditions of an optical waveguide which enable effectively single-mode propagation to be achieved are determined by conditions of the refractive index of the core and the core diameter (namely, refractive index profile in the radial direction of the core) and the winding diameter of the fiber and the like. At this time, it is necessary either the core have a low refractive index or the core diameter is small.

In contrast, in view of the properties of an optical amplifying medium, it is desirable for it to be possible to output even higher-power light. Namely, making it possible for high-power light to be propagated through an optical fiber is a requirement for a better amplifying optical fiber. However, in the case when a same light power is incident into an optical fiber having a small core diameter, then compared with the case when such light is incident into an optical fiber having a large core diameter, because the light-propagating cross-sectional area (i.e., the mode field diameter) in the former case is smaller than that in the latter case, the power density of the light being propagated through the core is increased. As a result, damage in the core glass due to the light and non-linear optical phenomena is easily induced. Alternatively, the amplified power during light propagation becomes restricted. Accordingly, for reasons such as these, larger core diameters are desirable. Consequently, in order to enlarge the core diameter and enable single-mode propagation to be realized, it is necessary to lower the core refractive index.

One of the factors which cause the properties of a fiber amplifier or fiber laser to deteriorate is loss increase (i.e., photodarkening) of an optical fiber which is caused by the pumping light or signal light propagated through the optical fiber (see Non-patent documents 1 and 2). Because of this loss increase, the optical amplifying efficiency of the rare earth-doped optical fiber serving as the light amplifying medium is gradually decreased. As a result, the output of the fiber amplifier or fiber laser is decreased over time and the product lifetime thereof is accordingly shortened.

Thus, various methods for suppressing photodarkening have been disclosed up to this time.

For example, in Non-patent document 1, a method is disclosed in which photodarkening is suppressed by employing a special manufacturing method known as DND (Direct Nanoparticle Deposition).

Moreover, in Non-patent document 2, a method is disclosed in which photodarkening is suppressed by doping a high concentration of aluminum into an optical fiber during the manufacturing thereof.

Moreover, in Patent document 1, a method is disclosed in which photodarkening is suppressed by doping hydrogen into an optical fiber.

DOCUMENTS RELATING TO THE PRIOR ART

Patent Documents

[Patent document 1] Japanese Unexamined Patent Application, First Publication No. 2007-114335

Non-Patent Documents

[Non-patent document 1] "The Potential of Direct Nanoparticle Deposition for the Next Generation of Optical Fibers" S. Tammela et. al., The Proceedings of SPIE Photonics West 2006, Vol. 6116-16 (2006)

[Non-patent document 2] "Population Inversion Factor Dependence of Photodarkening of Yb-doped Fibers and Its Suppression by Highly Aluminum Doping" T. Kitabayashi et. al., The Proceedings of OFC 2006, OThC5 (2006)

DISCLOSURE OF INVENTION

Problems to be Solved by the Invention

However, according to the method described in Non-patent document 1, although photodarkening is certainly suppressed more than when manufacturing is performed in accordance with the conventional method, the suppression effect is still insufficient. Moreover, because a special manufacturing method is employed, a larger number of hydroxyl (OH) group contaminate into the optical fiber, compared with a conventional method such as MCVD method or VAD method. As a result, an OH loss becomes high. Furthermore, the manufacturing costs of DND method also increase because the size of the fiber preform used for the manufacturing is limited. Consequently, it is not possible to manufacture an amplifying optical fiber in which photodarkening is suppressed at low cost.

In the method described in Non-patent document 2, it is necessary for a large quantity of aluminum to be used, in order to sufficiently suppress photodarkening. As a result of this, the refractive index of the core of the optical fiber becomes high. In this case, it is necessary to make the core diameter smaller in order for the optical fiber to be operated in single-mode. However, as is described above, the desired output power cannot be obtained.

According to the method described in Patent document 1, although photodarkening is able to be suppressed, it is necessary to perform a hydrogen immersing process and a light irradiation process. Accordingly, the manufacturing process is more complex, and it is difficult to manufacture optical fibers in a large quantity.

The present invention was conceived in view of the above described circumstances, and it is an object thereof to provide an optical fiber in which photodarkening is suppressed and which can be manufactured using a conventional method.

Means for Solving the Problem

The present invention employs the followings in order to solve the above described problems and achieve the desired objectives.
(1) An ytterbium-doped optical fiber of the present invention includes: a core which contains at least ytterbium, aluminum, and phosphorus; and a cladding which encircles the core, wherein an aluminum oxide equivalent concentration of the aluminum in the core is 0.2 mol % or more; a diphosphorus pentaoxide equivalent concentration of the phosphorus is higher than the equivalent concentration of the aluminum oxide.
(2) It is preferable for the core to either not contain germanium or to contain less than 1.1 mol % of germanium in a germanium dioxide equivalent concentration.
(3) It is preferable for the diphosphorus pentaoxide equivalent concentration in the core to be greater than a summation of an ytterbium oxide equivalent concentration of the ytterbium and the aluminum oxide equivalent concentration in the core.
(4) It is preferable for a ratio between an ytterbium oxide equivalent concentration and the aluminum oxide equivalent concentration in the core to be in a range of 0.01 to 2.
(5) It is preferable for the ytterbium oxide equivalent concentration in the core to be in a range of 0.01 to 1.0 mol %.
(6) It is preferable for the diphosphorus pentaoxide equivalent concentration in the core to be 20 mol % or less.
(7) It is preferable for the diphosphorus pentaoxide equivalent concentration to be not more than twice the aluminum oxide equivalent concentration in the core.
(8) It is preferable for a relative refractive index difference between the core and the cladding to be in a range of 0.05 to 0.65%.
(9) It is more preferable for a relative refractive index difference between the core and the cladding to be in a range of 0.05 to 0.25%.
(10) It is preferable for the core to further contain at least one of fluorine and boron.
(11) It is preferable for the core to further contain at least one element selected from a group consists of transition metal elements and rare earth elements other than ytterbium.
(12) It is preferable for at least two layers of cladding to be provided, and for a refractive index of the cladding on an inner side in a radial direction to be higher than a refractive index of the cladding on an outer side in the radial direction.
(13) In the case of (12), it is preferable for at least three layers of cladding to be provided, and for a refractive index $nc1$ of the cladding on an innermost side in the radial direction, a refractive index $nc3$ of the cladding on an outermost side in the radial direction, and a refractive index $nc2$ of an intermediate cladding between the innermost cladding and the outermost cladding to satisfy a relationship of $nc1>nc2>nc3$.
(14) A fiber laser of the present invention includes the ytterbium-doped optical fiber according to (1) as an optical amplifying medium.
(15) A fiber amplifier of the present invention includes the ytterbium-doped optical fiber according to (1) as an optical amplifying medium.

Effects of the Invention

In the ytterbium-doped optical fiber according to the above described (1), the aluminum oxide equivalent concentration of the aluminum in the core is 0.2 mol % or more, and a diphosphorus pentaoxide equivalent concentration of the phosphorus is higher than the aluminum oxide equivalent concentration. Because of this, crystallization of the glass is prevented and photodarkening is also suppressed. As a result, it is possible to provide optical fibers at low cost and in large quantities from which a superior optical amplifying effect can be obtained. Moreover, it is possible to provide a fiber laser and fiber amplifier at low cost which have superior optical characteristics and any decrease in output power thereof over time is suppressed, by using this type of optical fiber as an optical amplifying medium.

BEST MODE FOR CARRYING OUT THE INVENTION

Figure 1:
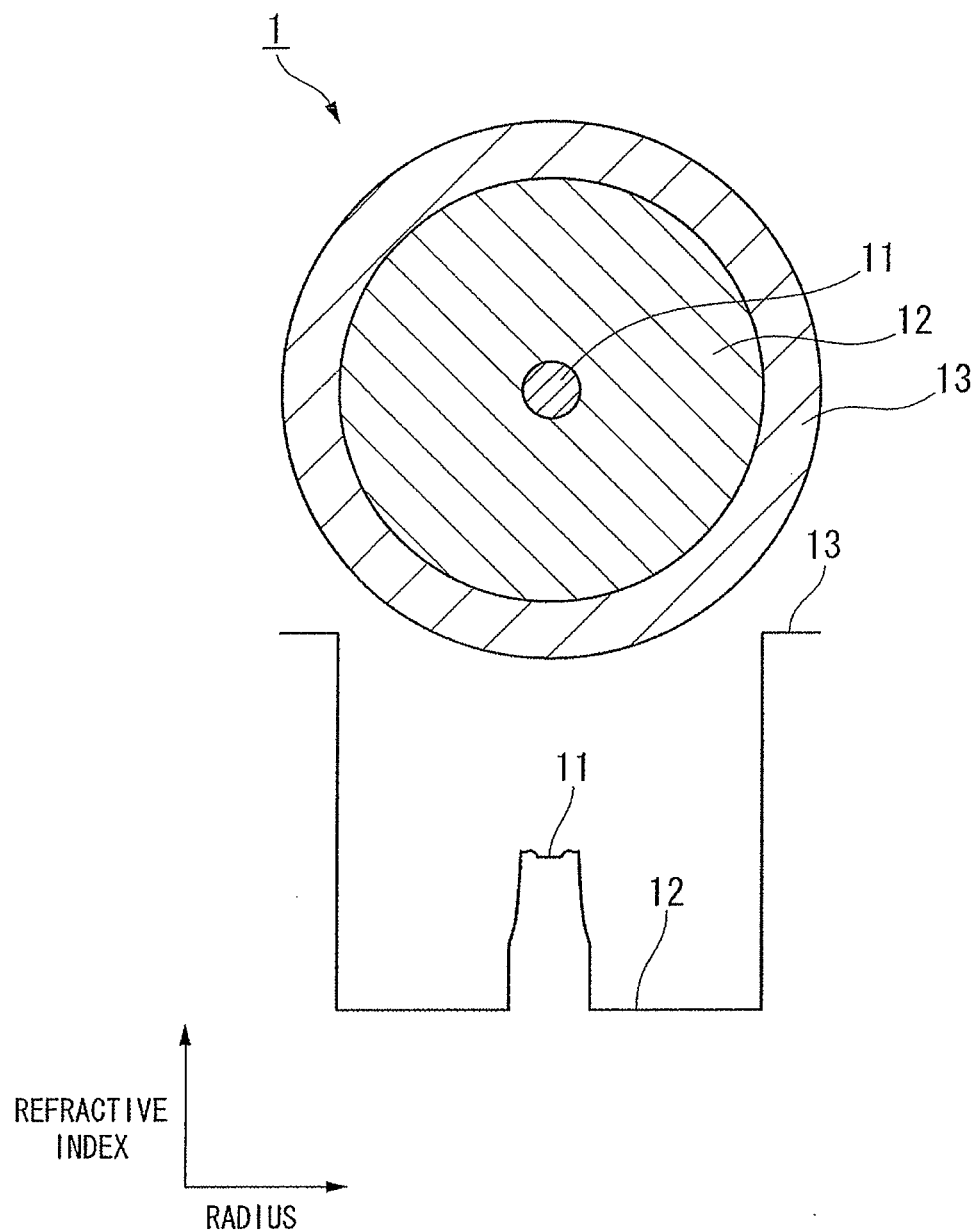
FIG. 1 is a view showing a cross section in the radial direction and a refractive index profile of an Yb-doped optical fiber manufactured according to Example 1 of the present invention.

The present invention will now be described in detail.

In the description given below, the concentration of doped components which is shown in units of "mol %" is an averaged value in the core in an optical fiber having a refractive index profile, unless specifically stated otherwise.

The term "core diameter" refers to a diameter having a relative refractive index difference of 1/e of the maximum relative refractive index difference of the core.

[Yb-Doped Optical Fiber]

The Yb-doped optical fiber of the present invention includes a core and cladding that surrounds this core. The core contains at least Yb, Al, and P. The equivalent concentration of aluminum oxide ($Al_2O_3$) of the aluminum in the core is 0.2 mol % or more, and the equivalent concentration of diphosphorus pentaoxide ($P_2O_5$) of the phosphorus in the core is higher than the equivalent concentration of the $Al_2O_3$.

P is a dopant which has a photodarkening suppression effect and a refractive index raising effect.

Al is a dopant which has a refractive index raising effect and a glass crystallization prevention effect (suppression effect).

Yb is a dopant which has a light amplifying effect.

The P in the core has a photodarkening suppression effect. However, in an optical fiber whose core only contains Yb and P, the glass becomes crystallized when the core refractive index is set to be the desired low value. Because of this, such optical fibers cannot be used as amplifying optical fibers. However, the crystallization of the glass can be prevented even if the core refractive index is set to be a desired low value while the photodarkening is suppressed, by doping Al in the core. The reason why Al has a glass crystallization prevention effect is thought to be because it causes the Yb and P to be dispersed throughout the glass microscopically.

In the present invention, the $P_2O_5$ equivalent concentration of the P (hereinafter, referred to simply as "$P_2O_5$ equivalent concentration") and the $Al_2O_3$ equivalent concentration of the Al (hereinafter, referred to simply as "$Al_2O_3$ equivalent concentration") in a core containing Yb are set within predetermined ranges, respectively. Both a high level of photodarkening suppression and glass crystallization prevention can be achieved, by setting those equivalent concentrations as described above.

Furthermore, in the present invention, an even more excellent light amplifying effect can be obtained without affecting (undermining) the photodarkening suppression effect and the glass crystallization prevention effect, by setting the Ytterbium oxide ($Yb_2O_3$) equivalent concentration of the Yb (hereinafter, referred to simply as "$Yb_2O_3$ equivalent concentration") to a preferable predetermined range.

Because of the above described reasons, in the present invention, the $Al_2O_3$ equivalent concentration in the core is set to be 0.2 mol % or more. Furthermore, the $Al_2O_3$ equivalent concentration is preferably set within a range of 0.2 to 12 mol %, and more specifically set within a range of 0.23 to 11.82 mol %. An even greater glass crystallization prevention effect can be obtained by setting the $Al_2O_3$ equivalent concentration to 0.2 mol % or more, even if the refractive index of the core is lowered. In addition, an even greater suppression effect of optical fiber transmission loss can be obtained, by setting the $Al_2O_3$ equivalent concentration to 12 mol % or less. This range of 0.2 to 12 mol % of the $Al_2O_3$ equivalent concentration corresponds to a range of 0.08 to 4.8 mol % (atomic percent) as a concentration of Al in the core.

Moreover, in the present invention, the $P_2O_5$ equivalent concentration in the core is set to higher than the $Al_2O_3$ equivalent concentration. As a result, a greater photodarkening suppression effect can be obtained while glass crystallization is also prevented.

Furthermore, the $P/O_5$ equivalent concentration is preferably not more than 19 times greater than the $Al_2O_3$ equivalent concentration, and is more preferably not more than 12 times, and is even more preferably not more than 5.5 times, and is most preferably not more than 2 times greater than the $Al_2O_3$ equivalent concentration. An even greater core refractive index rise suppression effect is obtained, by setting the $P_2O_5$ equivalent concentration within this range.

Moreover, the $P_2O_5$ equivalent concentration is preferably set to be 20 mol % or less, and more preferably set within a range of 0.5 to 20 mol %, and particularly preferably set within a range of 1.5 to 20 mol %, more specifically set within a range of 1.85 and 19.83 mol %. If an optical fiber contains a greater quantity of P than is necessary, then the transmission loss of the optical fiber increases. However, by setting the $P_2O_5$ equivalent concentration within the above described range, transmission loss is enough low and an even greater light amplifying effect can be obtained. The range of 1.5 to 20 mol % of the $P_2O_5$ equivalent concentration corresponds to a range of 0.43 to 5.7 mol % (atomic percent) as a concentration of P in the core.

Moreover, the $Yb_2O_3$ equivalent concentration in the core is preferably set within a range of 0.01 to 1.0 mol %, and more specifically set within a range of 0.01 to 0.99 mol %. By setting the $Yb_2O_3$ equivalent concentration more than 0.01 mol %, a greater light amplifying effect can be obtained. Moreover, by setting the $Yb_2O_3$ equivalent concentration less than 1.0 mol %, the Yb can be doped stably as a solid solution in the glass, and not only is photodarkening suppressed, but an excellent light amplifying efficiency can be obtained. Note that the range of 0.01 to 1.0 mol % of $Yb_2O_3$ equivalent concentration corresponds to a range of 0.004 to 0.4 mol % (atomic percent) as a concentration of Yb in the core.

The concentration ratio between the $Yb_2O_3$ equivalent concentration and the $Al_2O_3$ equivalent concentration (i.e., $Yb_2O_3$ equivalent concentration/$Al_2O_3$ equivalent concentration) in the core is preferably within a range of 0.01 to 2. By setting this ratio to be 2 or less, an even greater glass crystallization preventing effect of Al is obtained. In contrast, by setting this concentration ratio to be 0.01 or more, even if the Al content is reduced in order to lower the refractive index, even more superior optical characteristics and light amplifying effect can be obtained without content insufficiency of the Yb. Moreover, even if the Yb content is increased in order to obtain a sufficient optical amplifying effect, because the Al content can still be maintained within an appropriate range, the refractive index is not increased to a greater level than is necessary.

The $P_2O_5$ equivalent concentration is preferably larger than the summation of the $Yb_2O_3$ equivalent concentration and the $Al_2O_3$ equivalent concentration, and is more preferably in the range of 1.05 to 11.5 times this summation. An even greater photodarkening suppression effect is obtained while glass crystallization is prevented, by setting the $P_2O_5$ equivalent concentration within this range.

The core and cladding are preferably formed from silica glass. In addition to silica glass being commonly used for typical transmission optical fiber, it also makes it possible for transmission loss to be reduced and is effective in amplifying a light efficiently.

It is also possible for other elements to be included in the core in addition to Yb, Al, and P. It is possible to improve the function of an Yb-doped optical fiber or provide it with different functions, by doping other elements in the core.

For example, it is possible to easily form a fiber Bragg grating in an Yb-doped optical fiber by doping Ge in the core.

Moreover, by doping either one of or both of fluorine (abbreviated below to F) and boron (abbreviated below to B) in the core, controlling the refractive index profile of the core becomes easy and it is easy to obtain an optical fiber which has the desired optical characteristics.

Furthermore, by doping at least one type of element selected from a group which consists of transition metal elements and rare earth elements other than ytterbium in the core, it is possible to cause a co-dopant sensitization effect to be exhibited, or to change the pumping wavelength, or to cause oscillation to occur in an another specific wavelength.

The rare earth element may be a known rare earth element which is used in conventional Yb-doped optical fibers, and specific examples thereof include erbium (Er), thulium (Tm), yttrium (Y), holmium (Ho), samarium (Sm), praseodymium (Pr), neodymium (Nd), and the like.

The transition metal element may also be appropriately selected from known elements in accordance with the desired object.

Either one type or two or more types of these other elements may be doped in the core. In addition, these elements may be doped into the core using a known method such as solution method or the like.

The type of other element that is doped in the core may also be appropriately selected in accordance with the desired object. Moreover, the concentration thereof can be appropriately set in accordance with the type of element.

For example, if Ge is doped in the core, the germanium dioxide ($GeO_2$) equivalent concentration is preferably set in the range of 0.1 to 1.1 mol %, and more preferably set in the range of 0.3 to 0.59 mol %. The 0.1 to 1.1 mol % of the germanium dioxide ($GeO_2$) equivalent concentration corresponds to 0.035 to 0.37 mol % (atomic percent) of a Ge concentration in the core. It is known that there is approximately 0.1% rise in the relative refractive index per 1 mol % of $GeO_2$. Accordingly, in order to obtain a particular desired refractive index from an optical waveguide design, it is necessary to relatively decrease the doped amount of diphosphorus pentaoxide, aluminum oxide, and ytterbium oxide and the like which also have the refractive index raising effect. For example, if 2 mol % of germanium dioxide is doped, there is a 0.2% rise in relative refractive index of the core. Because of this, it is necessary to manufacture an optical fiber with a doped amount of either one or a plurality of diphosphorus pentaoxide, aluminum oxide, and ytterbium oxide, which results in decreasing the relative refractive index by approximately 0.2%. If the doped amount of the diphosphorus pentaoxide is decreased, the photodarkening suppression effect is insufficient, and if the doped amount of the aluminum oxide is decreased, it becomes impossible to manufacture a product because of glass crystallization. Moreover, if the doped amount of the ytterbium oxide is decreased, the amplifying effect is decreased by a corresponding amount, which is undesirable. For example, comparison is made in a case of an ytterbium-doped fiber in which a relative refractive index difference of 0.35% between the core and the cladding is designed, it is necessary to decrease the doped amount of diphosphorus pentaoxide, aluminum oxide, or ytterbium oxide, which results in decreasing of a relative refractive index by 0.2%. For example, if the 0.2% of the relative refractive index is decreased only by the diphosphorus pentaoxide, then it is necessary to decrease the doped amount of the diphosphorus pentaoxide by 4.3 mol %. As a result, the photodarkening suppression effect becomes insufficient. Moreover, if the 0.2% of the relative refractive index is decreased only by the aluminum oxide, then it is necessary to decrease the doped amount of the aluminum oxide by 1.4 mol %. As a result, the glass crystallization occurred, and it becomes impossible for a product to be manufactured. Moreover, because the concentration of the ytterbium oxide is generally small, it is not possible to reduce 0.2% of the relative refractive index only by the reduction of the doped amount of the ytterbium oxide. As can be clearly seen, there are many undesirable results if a large amount of $GeO_2$ is doped in the core. In contrast, if there is a small amount of $GeO_2$, then the object of adding the dopant is not satisfactorily achieved. For example, if a grating is to be formed to the optical fiber, the minimum limit required for the $GeO_2$ concentration is preferably set to be 0.1 mol %, and more preferably set to 0.3 mol % or more. In contrast, in consideration of the negative effects caused by a large amount of $GeO_2$, a maximum limit for the doped amount of $GeO_2$ is preferably set to be approximately 1.1 mol %, and more preferably set to be 0.59 mol % or less. If 0.6 mol % of germanium dioxide is doped, then there is a rise of approximately 0.06% in the relative refractive index of the core. Therefore, it is necessary to manufacture the optical fiber with the doped amount of either one or a plurality of diphosphorus pentaoxide, aluminum oxide, and ytterbium oxide, which results in decreasing of relative refractive index by approximately 0.06%. If the diphosphorus pentaoxide is decreased, the photodarkening suppression effect becomes insufficient, and if the aluminum oxide is decreased, it becomes impossible to manufacture a product because of the glass crystallization. Moreover, if the ytterbium oxide is decreased, it is undesirable because the amplifying effect is decreased by a corresponding amount. For example, a comparison is made in a case of an ytterbium-doped fiber in which a relative refractive index difference of 0.35% between the core and the cladding is designed, it is necessary to decrease the doped amount of diphosphorus pentaoxide, aluminum oxide, or ytterbium oxide, which results in decreasing of a relative refractive index by 0.06%. For example, if the 0.06% of the relative refractive index is decreased only by the diphosphorus pentaoxide, then it is necessary to decrease the doped amount of the diphosphorus pentaoxide by 1.3 mol %. As a result, the photodarkening suppression effect becomes insufficient. Moreover, if the 0.06% of the relative refractive index is decreased only by the aluminum oxide then it is necessary to decrease the doped amount of the aluminum oxide by 0.4 mol %. As a result, the glass crystallization occurred, and it becoming impossible for a product to be manufactured. Moreover, in the case where the 0.06% of the relative refractive index is decreased only by the ytterbium oxide, because the concentration of ytterbium oxide is generally small, a reduction of 0.06% in the relative refractive index only by the reduction of the ytterbium oxide is undesirable from the standpoint of amplifying efficiency.

Moreover, as described above, when there is no special reason for doping $GeO_2$ such as to form a grating or the like, it is desirable that, as far as possible, $GeO_2$ is not doped. The reason for this is that, as is described above, because there is a rise in the refractive index due to the $GeO_2$ being doped irrespective of the fact that the doping of the $GeO_2$ has no specific effect on photodarkening, there is a decreased power resistant in contrast to there being a decrease in the effective cross-sectional area. In the same way, when there is no specific effect by doping another element other than Al or P which raises the refractive index (such as Ti or the like), then it is desirable that, as far as possible, there is no doping of such an element which raises the refractive index (refractive index raising element).

Moreover, in a case when B is doped in the core, the boron oxide ($B_2O_3$) equivalent concentration is preferably set within a range of 0.01 to 5 mol %, and more preferably set within a range of 0.05 to 1 mol %. An increase in residual stress is suppressed and an optical fiber with a sufficient strength is obtained, by setting the boron oxide equivalent concentration to less than the upper limit value of this range.

Moreover, in a case when F is doped in the core, then it is preferably doped within a concentration range of 0.05 to 3 mol %, and more preferably within a range of 0.1 to 1 mol %. The costs can be reduced by setting the concentration to less than the upper limit value of this range.

Moreover, in a case when erbium (Er) is doped as a rare earth element or transition metal element in the core, the erbium oxide ($Er_2O_3$) equivalent concentration is preferably set within a range of 0.01 to 1 mol %, and more preferably set within a range of 0.05 to 0.5 mol %. Some problems such as concentration quenching and the like can be suppressed, by setting the erbium oxide equivalent concentration to less than the upper limit value of this range.

It is possible for the elements such as Yb and the like in the core to have a distributed concentration in the core. However, in order to obtain superior optical characteristics, it is preferable for the concentration to be substantially uniform.

The cladding may have a single layer structure or may have a multiple layer structure such as a double layer structure, triple layer structure or the like.

For example, a higher output light (light with higher output power) can be obtained than from a single-cladding fiber by employing a multi-cladding fiber such as a double-cladding fiber, triple-cladding fiber or the like. In the multi-cladding fiber, it is possible to suppress power density of the pumping light in the core by guiding pumping light to the cladding. As a result, it is possible to suppress any damage to the core glass and to suppress non-linear optical phenomena due to the pumping light, and to manufacture a fiber laser or fiber amplifier having an even greater output power. In view of this, a triple-cladding fiber which has a high level of utilization efficiency of pumping light is preferable than a double-clad fiber.

Moreover, the shape of the cladding is not particularly limited and may be appropriately selected in accordance with the desired object. For example, as is shown in FIG. 5 and FIGS. 7 through 10, in order to suppress skew modes, it is preferable for the cross-sectional shape of the cladding in a radial direction to be a non-circular shape such as a polygonal shape and a D-shape or the like.

Moreover, it is also possible for stress induced portions (stress applying portion) to be provided in the vicinity of the core. The stress induced portions may be formed, for example, from a material obtained by doping $B_2O_3$ or the like into silica glass.

Figure 12:
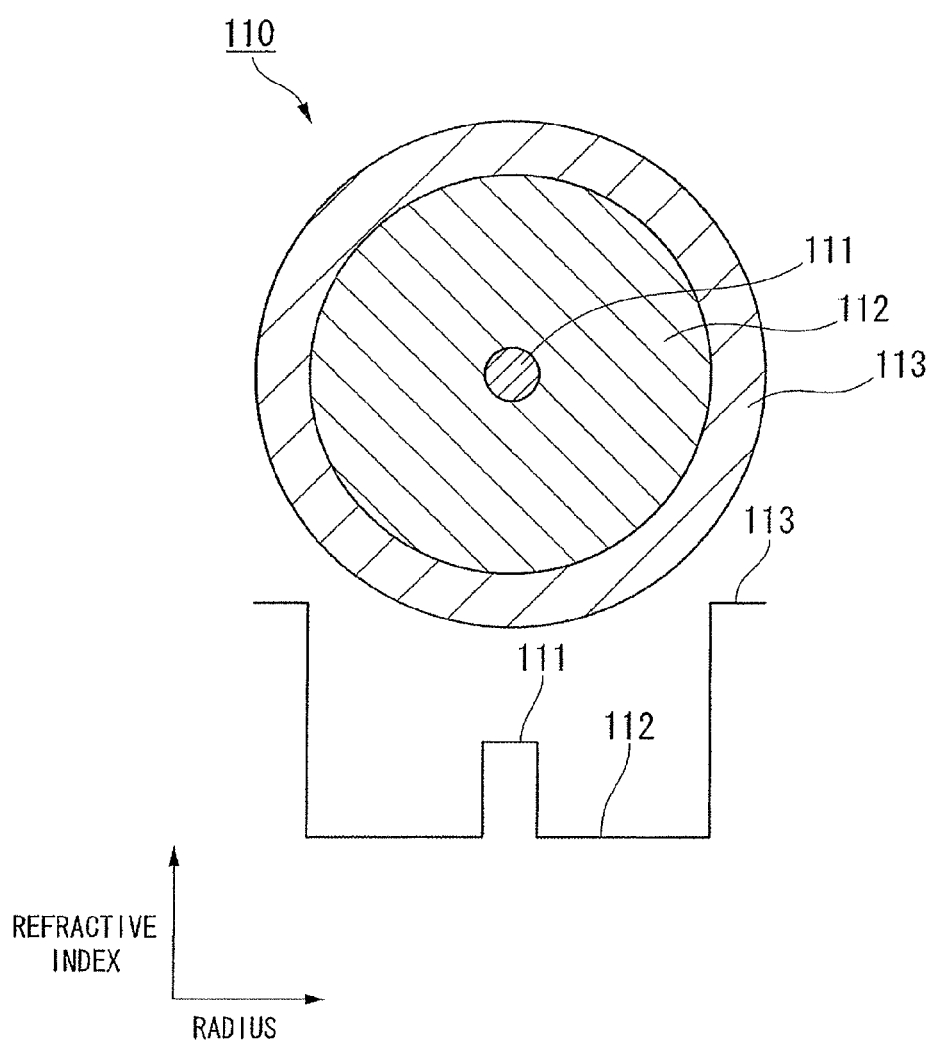
FIG. 12 is a view showing an example of a cross section in the radial direction of a conventional Yb-doped optical fiber and of the refractive index profile thereof.

The refractive index profile of a core may be appropriately adjusted in accordance with the desired object. For example, the refractive index profile may be a known type of profile such as a step index profile such as shown in FIG. 12, or a graded core profile, an O-ring profile, a dual-core shape profile, a segmented-core profile, a double O-ring profile, or a W profile such as those shown in FIG. 1 and FIGS. 3 through 10.

The refractive indexes of the core and cladding are preferably adjusted taking consideration given to the structure of the Yb-doped optical fiber or to the desired refractive index difference and the like into account.

For example, in order to confine guided light, it is preferable for the refractive index of the core to be higher than the refractive index of the cladding.

Moreover, in the case of a multi-cladding fiber in which at least two layers of cladding are provided, it is preferable for the refractive index of the cladding on the inner side in a radial direction to be higher than the refractive index of the cladding on the outer side in a radial direction. By employing such a structure, a higher output light can be obtained. Note that here the terms "inner side in a radial direction" and "outer side in a radial direction" refer to a relative positional relationship in the radial direction of a two-layer cladding.

Accordingly, the terms "inner side of the cladding in a radial direction" and "outer side of the cladding in a radial direction" refer not just to the two-layer cladding of a double-cladding fiber, but may also refer to any two layers of cladding in a multi-cladding fiber which is provided with three or more layers of cladding.

Moreover, in the case of a multi-cladding fiber in which at least three layers of cladding are provided, it is preferable for a refractive index nc1 of a cladding on the innermost side in a radial direction, a refractive index nc3 of a cladding on the outermost side in a radial direction, and a refractive index nc2 of an intermediate cladding between the claddings on the innermost side and the outermost side to satisfy a relationship of nc1>nc2>nc3. By employing such a structure, a higher output light can be efficiently obtained.

Here the term "intermediate cladding" refers to any cladding layer located between the cladding layers on the innermost and outermost sides, and does not refer solely, for example, to the intermediate cladding between the cladding layers on the innermost side and outermost side of a triple-cladding fiber.

The relative refractive index difference between the core and cladding is preferably between 0.05 and 0.65%, and more preferably between 0.05 and 0.25%. By setting the relative refractive index difference to be 0.65% or less, when the optical fiber is being used in an effectively single-mode conditions, the core diameter does not become too small and the optical power density does not become too high. Namely, a great effect of suppressing non-linear optical phenomena or preventing damage to the core glass caused by light is obtained. As a result, high output light can be easily obtained. Moreover, by setting the relative refractive index difference to be 0.25% or less, even higher output light can be obtained. In contrast, by setting the relative refractive index difference to be 0.05% or more, a sufficient light confinement effect is obtained and light can be guided more stably with respect to bending of the optical fiber or lateral stress applied thereto.

Here, the term "relative refractive index difference between the core and cladding" refers to a value calculated using the formula $(n_1-n_0)/n_1 \times 100(\%)$ when the refractive index of the core is set to be $n_1$ and the refractive index of the cladding is set to be $n_0$.

The core diameter is preferably appropriately set in accordance with the refractive index of the core. Normally, it is preferably set to between 3 and 50 μm, and more preferably to between 4 and 43 μm.

Except for the fact that Yb, Al, and P are doped into the core in predetermined amount, the Yb-doped optical fiber of the present invention can be manufactured using a conventional manufacturing method.

For example, the Yb-doped optical fiber of the present invention can be manufactured by preparing a fiber preform using MCVD method or VAD method, and by then drawing this until it has the desired outer diameter. A protective coating layer is then formed on the outer circumference thereof using UV cured resin or the like. The Yb can be doped in the fiber preform preparation process using a method such as doping into soot by solution method, or spraying method.

Moreover, in a case when, for example, the shape of the cladding is a non-circular shape, the outside of the fiber preform can be ground to the desired shape after it has been doped with the Yb, and it can then be drawn.

Moreover, in a case when, for example, a stress induced portion is provided in the cladding, a hole is formed in the Yb-doped fiber preform in the longitudinal direction thereof. Preferably, after the inner surface of this hole has been mirroring surface by grinding and polishing, a stress induced portion formed from $B_2O_3$—$SiO_2$ glass which has been prepared using MCVD method or the like is inserted into the hole, and the resulting fiber is then drawn.

[Fiber Laser, Fiber Amplifier]

The fiber laser and fiber amplifier of the present invention are characterized in that they have the above described Yb-doped optical fiber of the present invention as an optical amplifying medium.

Moreover, except for the fact that the above described Yb-doped optical fiber of the present invention is used as the optical amplifying medium, the fiber laser and fiber amplifier of the present invention can be manufactured using the same methods as those used to manufacture conventional fiber lasers and fiber amplifiers.

According to the present invention, it is possible using a conventional method such as MCVD method or VAD method to manufacture an Yb-doped optical fiber in which the desired high output light can be obtained and which exhibits a superior photodarkening suppression effect. Moreover, there are no limits on the size of the fiber preform which is used to manufacture this optical fiber. Accordingly, it is possible to provide an Yb-doped optical fiber having the above described superior properties at low cost and in large quantities.

Moreover, by using the above described type of optical fiber as an optical amplifying medium, any decrease in output power over time is suppressed, and it is possible to provide a fiber laser and fiber amplifier having excellent optical properties at low cost.

EXAMPLES

Hereinafter, the present invention will be described in more detail using specific examples. It should be noted, however, that the present invention is in no way limited to these examples.

In the examples given below, the loss increase which is caused by photodarkening in an Yb-doped optical fiber is evaluated using the method described below. As a result of this, it is possible to relatively compare loss increase in optical fibers having mutually between the fibers with different applications and structures.

(Method of Evaluating Loss Increase Caused by Photodarkening)

Using an Yb-doped optical fiber whose length was in the longitudinal direction such that the Yb absorption of the core was 340 dB, pumping light having a wavelength of 976 nm was irradiated for 100 minutes into this core such that the irradiated light power was 400 mW. The difference in the losses before and after irradiation at a wavelength of 800 nm was taken as the loss increase caused by photodarkening.

Example 1

An Yb-doped optical fiber having the structure shown in FIG. 1 was prepared. FIG. 1 shows a refractive index profile and a cross section in the radial direction of an Yb-doped optical fiber 1. The Yb-doped optical fiber 1 is a single cladding fiber. Cladding 12 is provided on an outer circumference of a core 11, and a protective coating layer 13 is provided on an outer circumference of the cladding 12.

A fiber preform was prepared using MCVD method. The then Yb is doped using solution method. The fiber preform was then drawn until the outer diameter of the glass was approximately 125 μm, and a protective coating layer was then provided on the outer circumference thereof.

1.67 mol % of $Al_2O_3$ was contained in the core. In the same way, 0.54 mol % of $Yb_2O_3$ and 8.37 mol % of $P_2O_5$ were also contained in the core. The diameter of the core was approximately 4.9 μm, and the relative refractive index difference (Δ) of the core was approximately 0.64%.

Figure 2:
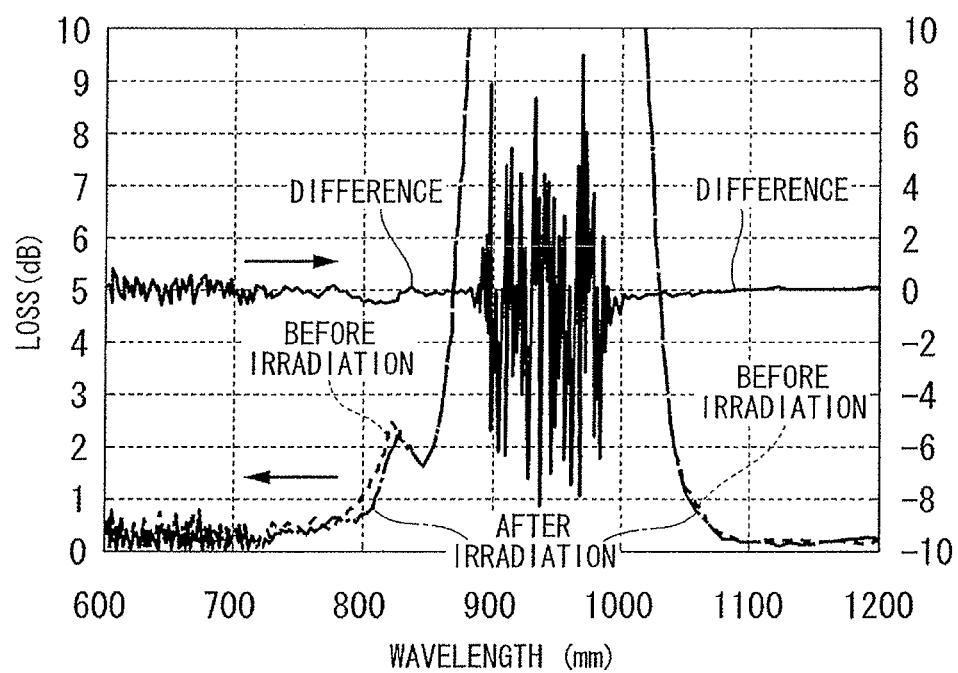
FIG. 2 is a graph showing a relationship between loss before and after an irradiation of pumping light and a wavelength dependence of a loss increase after the irradiation thereof in Example 1 of the present invention.

There was substantially no sign of any loss increase which was caused by photodarkening in the obtained Yb-doped optical fiber. The loss increase measured using the aforementioned evaluation method was 0.01 dB or less. A graph showing a relationship between the loss before and after the irradiation of pumping light at the time, and the wavelength dependence of the loss increase (the loss deference between before and after the irradiation of pumping light) is shown in FIG. 2. In FIG. 2, the reason why noise can be seen in the loss data around the 1000 nm wavelength is because an absorption band of Yb exists in this wavelength band.

Moreover, using the obtained Yb-doped optical fiber, a fiber amplifier was produced and its changes in optical output power over time were evaluated. As a result, it was found that in a fiber amplifier having an initial output power of 1.5 W, the decrease in output power after a time lapse of 100 hours is 3% or less. This in output power includes loss caused by factors such as changes in temperature and measurement uncertainty in addition to loss increase in the optical fiber. As a result, it was considered that the decrease in output power caused by loss increase from photodarkening was 1% or less.

The obtained Yb-doped optical fiber and the evaluation results for this fiber are shown in Table 1.

Example 2

Figure 3:
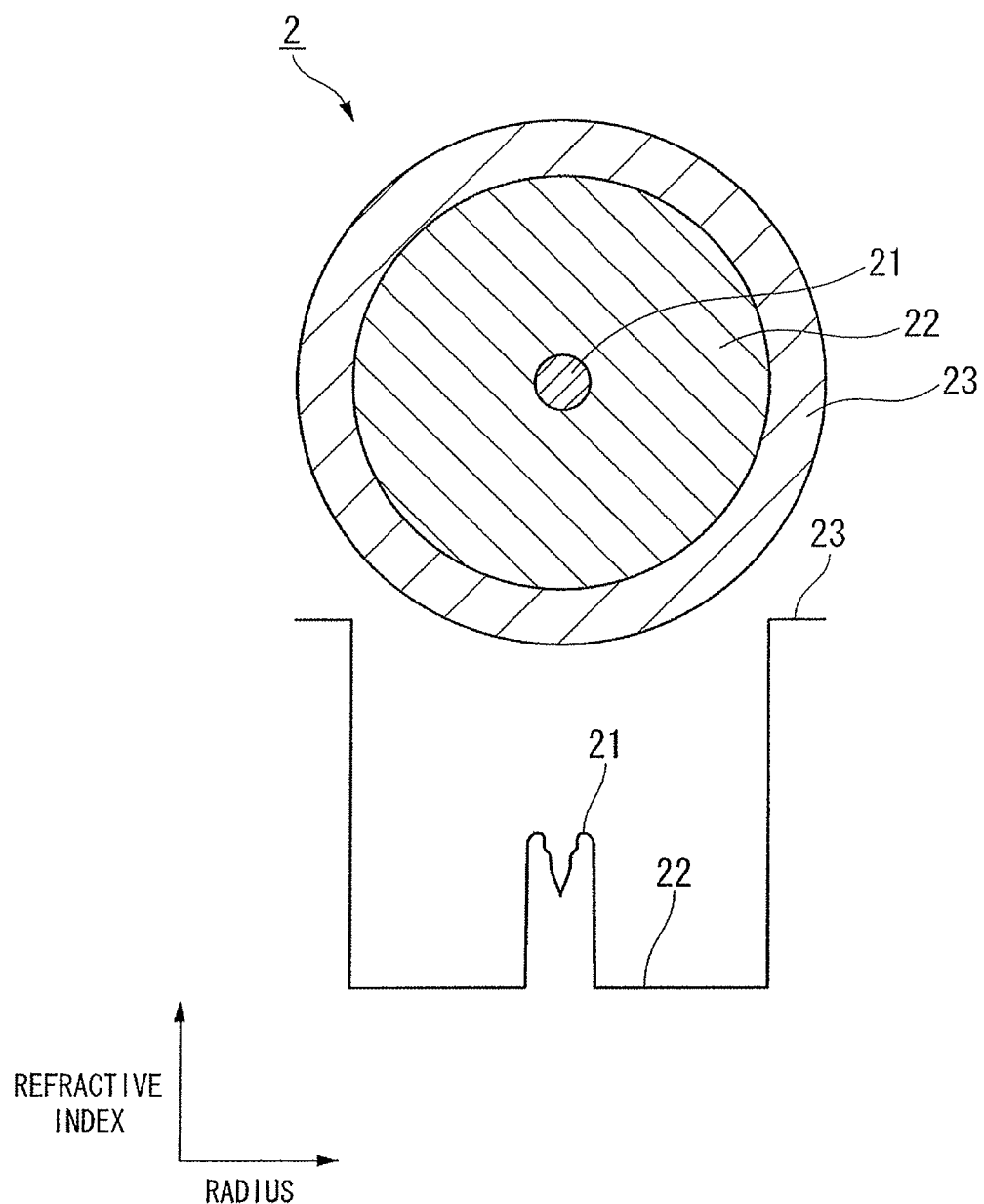
FIG. 3 is a view showing a cross section in the radial direction and a refractive index profile of an Yb-doped optical fiber manufactured according to Example 2 of the present invention.

An Yb-doped optical fiber having the structure shown in FIG. 3 was prepared. FIG. 3 shows a refractive index profile and a cross section in the radial direction of an Yb-doped optical fiber 2. The Yb-doped optical fiber 2 is a single cladding fiber.

Cladding 22 is provided on an outer circumference of a core 21, and a protective coating layer 23 is provided on an outer circumference of the cladding 22.

A fiber preform was prepared using VAD method. The Yb is doped using solution method. The fiber preform was then drawn until the outer diameter of the glass was approximately 125 μm, and a protective coating layer was then provided on the outer circumference thereof.

0.84 mol % of $Al_2O_3$ was contained in the core. In the same way, 0.15 mol % of $Yb_2O_3$ and 3.85 mol % of $P_2O_5$ were also contained in the core. The diameter of the core was approximately 7 μm, and the relative refractive index difference (Δ) of the core was approximately 0.25%.

There was substantially no sign of any loss increase which was caused by photodarkening in the obtained Yb-doped optical fiber. The loss increase measured using the aforementioned evaluation method was 0.01 dB or less.

Moreover, using the obtained Yb-doped optical fiber, a fiber laser was produced and its changes in optical output power over time were evaluated. As a result, it was found that in a fiber laser having an initial output power of 3 W, a decrease in output power after a time lapse of 100 hours is 3% or less. This decrease in output power includes loss caused by factors such as changes in temperature and measurement uncertainty in addition to loss increase in the optical fiber. As a result, it was considered that the decrease in output power caused by loss increase from photodarkening was 1% or less.

The obtained Yb-doped optical fiber and the evaluation results for this fiber are shown in Table 1.

Example 3

Figure 4:
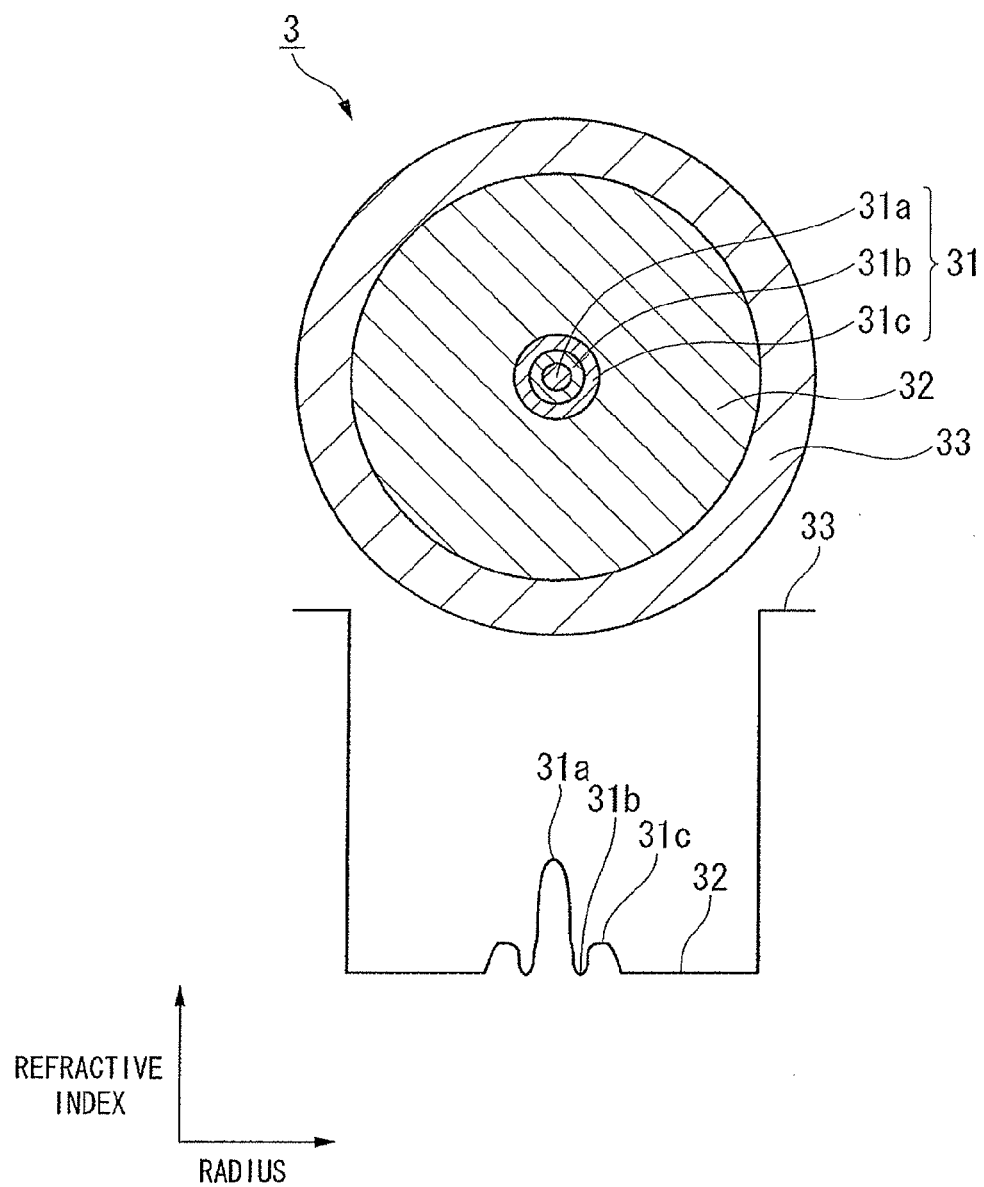
FIG. 4 is a view showing a cross section in the radial direction and a refractive index profile of an Yb-doped optical fiber manufactured according to Example 3 of the present invention.

An Yb-doped optical fiber having the structure shown in FIG. 4 was prepared. FIG. 4 shows a refractive index profile and a cross section in the radial direction of an Yb-doped optical fiber 3. The Yb-doped optical fiber 3 is a single cladding fiber having a core 31 which has a three-layer structure. Cladding 32 is provided on an outer circumference of the core 31, and a protective coating layer 33 is provided on an outer circumference of the cladding 32. The core 31 consists of center core 31a, a ring groove 31b which is provided on an outer circumference of the center core 31a, and a ring core 31c which is provided on an outer circumference of the ring groove 31b.

A fiber preform was prepared using MCVD method. The Yb is doped using solution method. The fiber preform was then drawn until the outer diameter of the glass was approximately 125 μm, and a protective coating layer was then provided on the outer circumference thereof.

0.80 mol % of $Al_2O_3$ was contained in the core. In the same way, 0.17 mol % of $Yb_2O_3$ and 3.53 mol % of $P_2O_5$ were also contained in the core. The diameter of the core was approximately 10.3 μm, and the relative refractive index difference (Δ) of the core was approximately 0.15%.

There was substantially no sign of any loss increase which was caused by photodarkening in the obtained Yb-doped optical fiber. The loss increase measured using the aforementioned evaluation method was 0.01 dB or less.

Moreover, using the obtained Yb-doped optical fiber, a fiber laser was produced and its changes in optical output power over time were evaluated. As a result, it was found that in a fiber laser having an initial output power of 4.5 W, a decrease in output power after a time lapse of 100 hours is 4% or less. This decrease in output power includes loss caused by factors such as changes in temperature and measurement uncertainty in addition to loss increase in the optical fiber. As a result, it was considered that the decrease in output power caused by loss increase from photodarkening was 2% or less.

The obtained Yb-doped optical fiber and the evaluation results for this fiber are shown in Table 1.

Example 4

Figure 5:
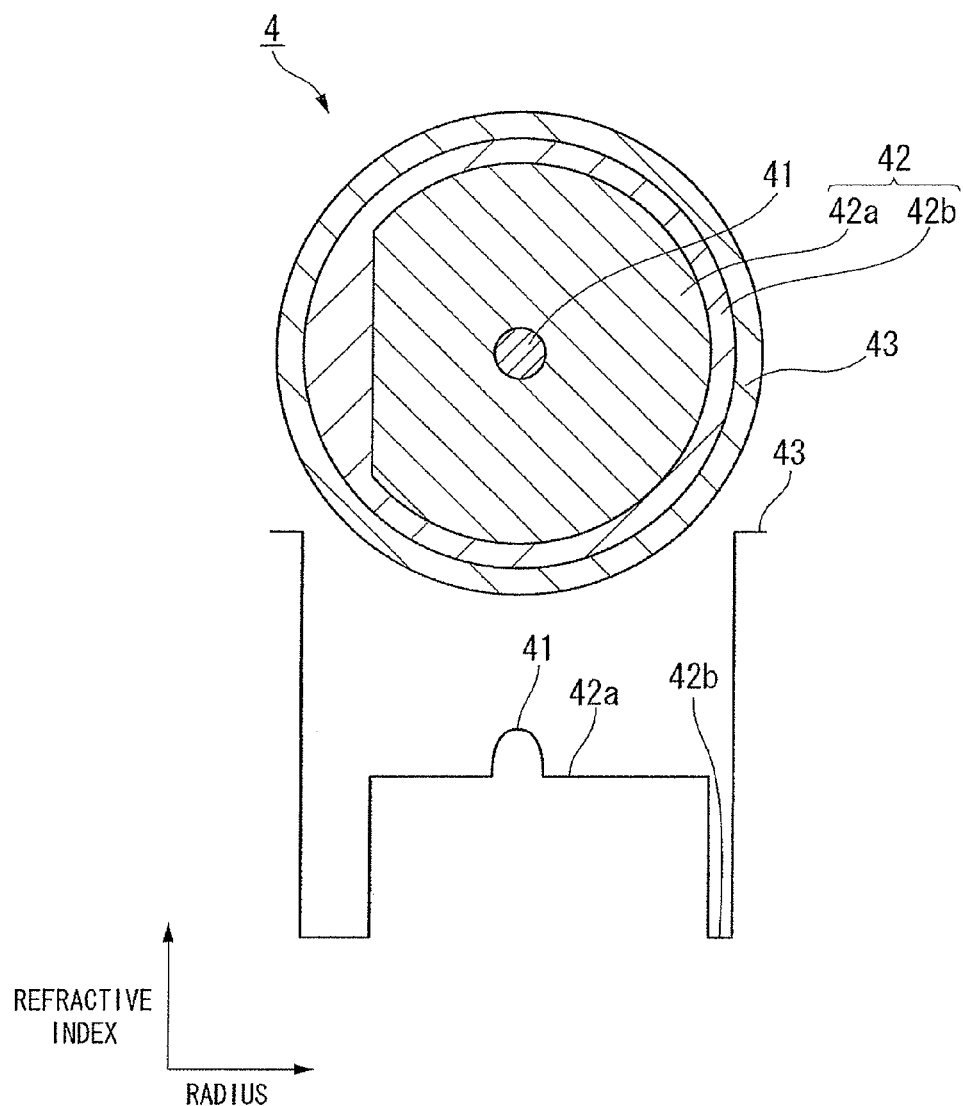
FIG. 5 is a view showing a cross section in the radial direction and a refractive index profile of an Yb-doped optical fiber manufactured according to Example 4 of the present invention.

An Yb-doped optical fiber having the structure shown in FIG. 5 was prepared. FIG. 5 shows a refractive index profile and a cross section in the radial direction of an Yb-doped optical fiber 4. The Yb-doped optical fiber 4 is a double cladding fiber having cladding 42 which has a two-layer structure. Inner side cladding 42a is provided on an outer circumference of a core 41, outer side cladding 42b is provided on an outer circumference of the inner side cladding 42a, and a protective coating layer 43 is provided on an outer circumference of the outer side cladding 42b. The inner side cladding 42a is formed having a D-shaped cross-sectional configuration.

A fiber preform was prepared using MCVD method. The Yb is doped using spraying method in a soot preparation. At this point of time, the outside of the circular cylindrical-shaped fiber preform was ground such that the cross-sectional configuration thereof was changed into a D-shaped configuration such as shown in FIG. 5. The obtained fiber preform was then drawn until the diameter of a circumscribed circle of the cross section of the glass was approximately 250 μm. At this time, a polymer cladding material having a lower refractive index than that of the glass was coated onto the outer circumference of the glass and then cured so as to form a structure in which pumping light was confined in the glass cladding. In addition, the outer circumference thereof was coated with a protective UV cured resin.

0.92 mol % of $Al_2O_3$ was contained in the core. In the same way, 0.19 mol % of $Yb_2O_3$ and 2.09 mol % of $P_2O_5$ were also contained in the core. The diameter of the core was approximately 18.7 μm, and the relative refractive index difference (Δ) of the core was approximately 0.10%. A cladding NA which was obtained from a refractive index difference between the glass cladding guiding the pumping light and the polymer cladding confining the light was approximately 0.41.

There was substantially no sign of any loss increase which was caused by photodarkening in the obtained Yb-doped optical fiber. The loss increase measured using the aforementioned evaluation method was 0.01 dB or less.

Moreover, using the obtained Yb-doped optical fiber, a fiber laser was produced and its changes in optical output power over time were evaluated. As a result, it was found that in a pulse fiber laser having an initial output power of 14.8 W, a decrease in output power after a time lapse of 100 hours is 1% or less. This decrease in output power includes loss caused by factors such as changes in temperature and measurement uncertainty in addition to loss increase in the optical fiber. As a result, it was considered that there was substantially no decrease in output power caused by loss increase from photodarkening.

The obtained Yb-doped optical fiber and the evaluation results for this fiber are shown in Table 1.

Example 5

Figure 6:
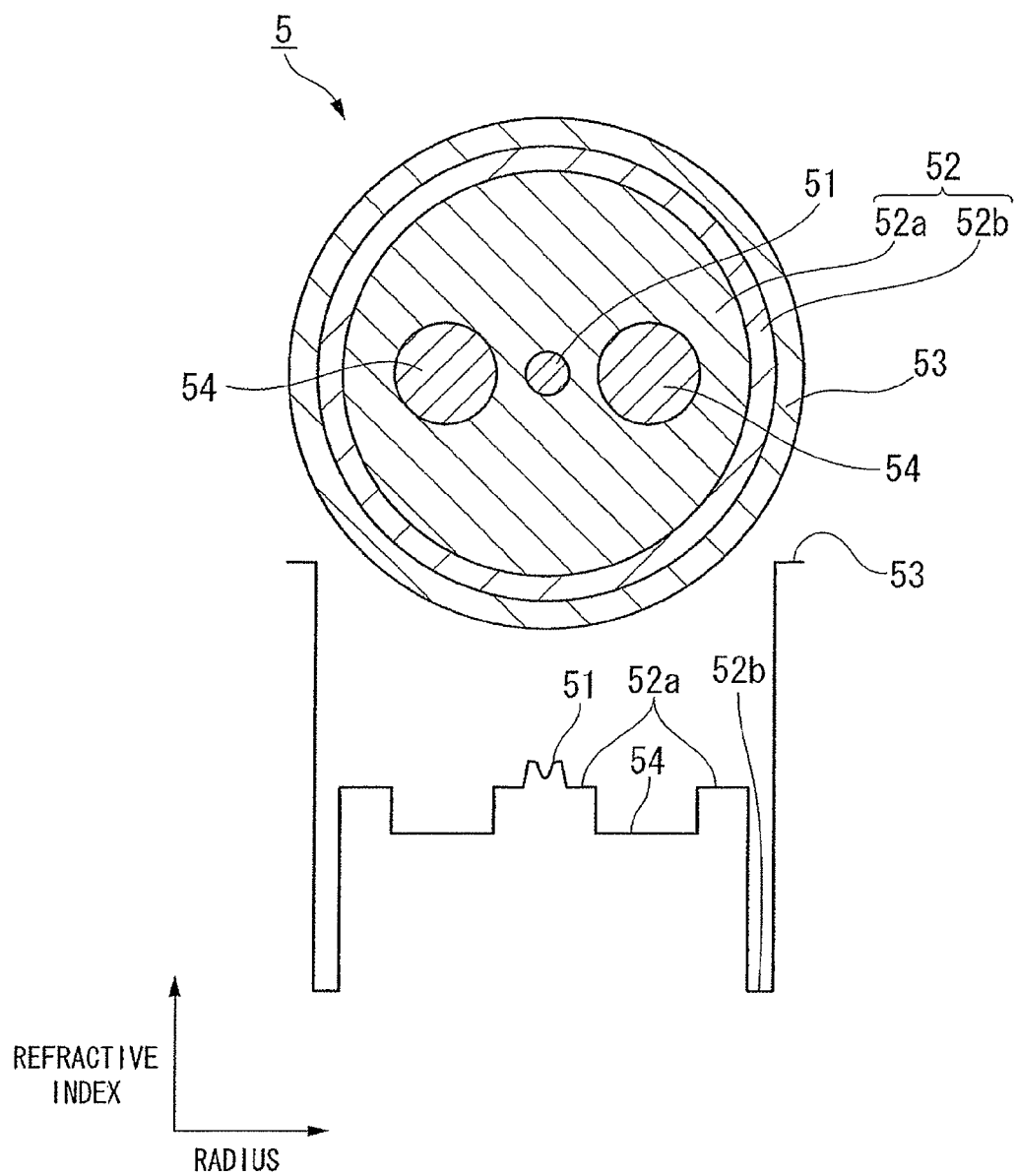
FIG. 6 is a view showing a cross section in the radial direction and a refractive index profile of an Yb-doped optical fiber manufactured according to Example 5 of the present invention.

An Yb-doped optical fiber having the structure shown in FIG. 6 was prepared. FIG. 6 shows a refractive index profile and a cross section in the radial direction of an Yb-doped optical fiber 5. The Yb-doped optical fiber 5 is a double cladding fiber having cladding 52 which has a two-layer structure. Inner side cladding 52a is provided on an outer circumference of a core 51, outer side cladding 52b is provided on an outer circumference of the inner side cladding 52a, and a protective coating layer 53 is provided on an outer circumference of the outer side cladding 52b. In addition, a pair of stress induced portions 54 and 54 is provided in the inner side cladding 52a at symmetrical positions relative to the core 51.

A fiber preform was prepared using VAD method. The Yb is then doped using spraying method in a soot preparation. A pair of holes is formed so as to be positioned symmetrically relative to the core in the longitudinal direction of the fiber preform. Stress induced glass manufactured by adding boron or the like was inserted into these holes. The fiber preform was then drawn until the outer diameter of the glass was approximately 125 µM. At this time, a polymer cladding material having a lower refractive index than that of the glass was coated onto the outer circumference of the glass and then cured so as to form a structure in which pumping light was confined in the glass cladding. In addition, the outer circumference thereof was coated with a protective UV cured resin.

As a result, a polarization-maintaining optical fiber was obtained containing 5.32 mol % of $Al_2O_3$, 0.33 mol % of $Yb_2O_3$ and 6.86 mol % of $P_2O_5$ in the core. The diameter of the core was approximately 10.3 µm, and the relative refractive index difference ($\Delta$) of the core was approximately 0.15%. A cladding NA which was obtained from a refractive index difference between the glass cladding guiding the pumping light and the polymer cladding confining the light was approximately 0.46.

There was substantially no sign of any loss increase which was caused by photodarkening in the obtained Yb-doped optical fiber. The loss increase measured using the aforementioned evaluation method was 0.01 dB or less.

Moreover, using the obtained Yb-doped optical fiber, a fiber laser was produced and its changes in optical output power over time were evaluated. As a result, it was found that in a fiber laser having an initial output power of 10.8 W, a decrease in output power after a time lapse of 100 hours is 4% or less. This decrease in output power includes loss caused by factors such as changes in temperature and measurement uncertainty in addition to loss increase in the optical fiber. As a result, it was considered that the decrease in output power caused by loss increase from photodarkening was 2% or less.

The obtained Yb-doped optical fiber and the evaluation results for this fiber are shown in Table 1.

Example 6

Figure 7:
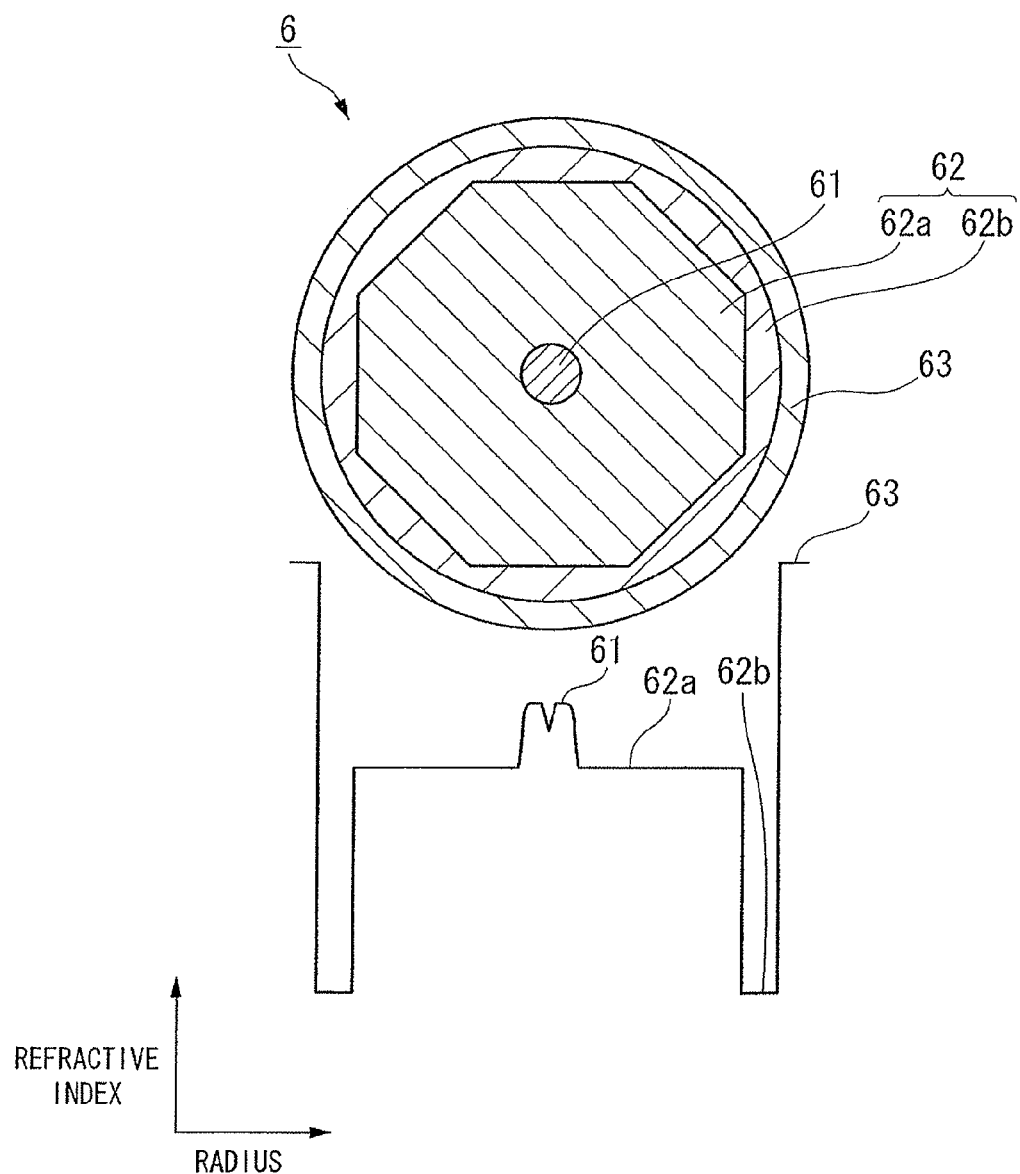
FIG. 7 is a view showing a cross section in the radial direction and a refractive index profile of an Yb-doped optical fiber manufactured according to Example 6 of the present invention.

An Yb-doped optical fiber having the structure shown in FIG. 7 was prepared. FIG. 7 shows a refractive index profile and a cross section in the radial direction of an Yb-doped optical fiber 6. The Yb-doped optical fiber 6 is a double cladding fiber having cladding 62 which has a two-layer structure. Timer side cladding 62a is provided on an outer circumference of a core 61, outer side cladding 62b is provided on an outer circumference of the inner side cladding 62a, and a protective coating layer 63 is provided on an outer circumference of the outer side cladding 62b. The inner side cladding 62a has a substantially octagonal-shaped cross-sectional configuration, and the core 61, the inner side cladding 62a, and the outer side cladding 62b are provided concentrically.

A fiber preform was prepared using VAD method. The Yb is doped using solution method. At this point, the outside of the circular cylindrical-shaped fiber preform was ground such that the cross-sectional configuration thereof was changed into an octagonal-shaped configuration such as that shown in FIG. 7. The obtained fiber preform was then drawn until the diameter of a circumscribed circle of the cross section of the glass was approximately 400 µm. At this time, a polymer cladding material having a lower refractive index than that of the glass was coated onto the outer circumference of the glass and then cured so as to form a structure in which pumping light was confined in the glass cladding.

In addition, the outer circumference thereof was coated with a protective UV cured resin.

0.78 mol % of $Al_2O_3$ was contained in the core. In the same way, 0.14 mol % of $Yb_2O_3$ and 1.85 mol % of $P_2O_5$ were also contained in the core. The diameter of the core was approximately 35 µm, and the relative refractive index difference ($\Delta$) of the core was approximately 0.09%. A cladding NA which was obtained from a refractive index difference between the glass cladding guiding the pumping light and the polymer cladding confining the light was approximately 0.43.

There was substantially no sign of any loss increase which was caused by photodarkening in the obtained Yb-doped optical fiber. The loss increase measured using the aforementioned evaluation method was 0.01 dB or less.

Moreover, using the obtained Yb-doped optical fiber, a fiber laser was produced and its changes in optical output power over time were evaluated. As a result, it was found that in a fiber laser having an initial output power of 122 W, a decrease in output power after a time lapse of 100 hours is 6% or less. This decrease in output power includes loss caused by factors such as changes in temperature and measurement uncertainty in addition to loss increase in the optical fiber. As a result, it was considered that the decrease in output power caused by loss increase from photodarkening was 3% or less.

The obtained Yb-doped optical fiber and the evaluation results for this fiber are shown in Table 1.

Example 7

Figure 8:
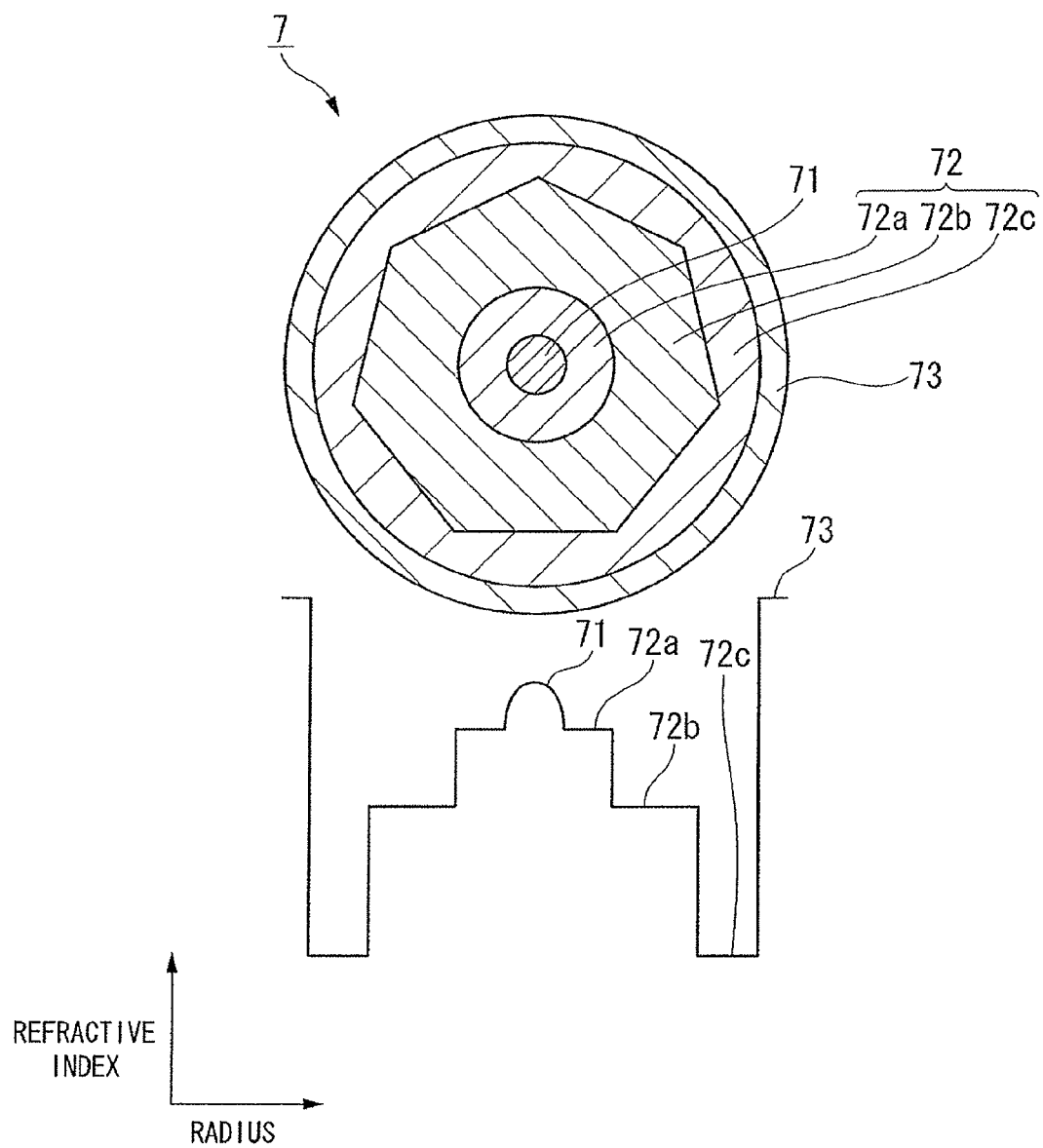
FIG. 8 is a view showing a cross section in the radial direction and a refractive index profile of an Yb-doped optical fiber manufactured according to Example 7 of the present invention.

An Yb-doped optical fiber having the structure shown in FIG. 8 was prepared. FIG. 8 shows a refractive index profile and a cross section in the radial direction of an Yb-doped optical fiber 7. The Yb-doped optical fiber 7 is a triple cladding fiber having cladding 72 which has a three-layer structure. Innermost cladding 72a is provided on an outer circumference of a core 71, intermediate cladding 72b is provided on an outer circumference of the innermost cladding 72a, outermost cladding 72c is provided on an outer circumference of the intermediate cladding 72b, and a protective coating layer 73 is provided on an outer circumference of the outermost cladding 72c. The intermediate cladding 72b has a substantially heptagonal-shaped cross-sectional configuration, and the core 71, the innermost cladding 72a, the intermediate cladding 72b, and the outermost cladding 72c are provided concentrically.

A fiber preform was prepared using MCVD method. The Yb is doped using solution method. At this point, the outside of the circular cylindrical-shaped fiber preform was grinded such that the cross-sectional configuration thereof was changed into a heptagonal-shaped configuration such as that shown in FIG. 8. The obtained fiber preform was then drawn until the diameter of a circumscribed circle of the cross section of the glass was approximately 380 μm. At this time, a polymer cladding material having a lower refractive index than that of the glass was coated onto the outer circumference of the glass and then cured so as to form a structure in which pumping light was confined in the glass cladding. In addition, the outer circumference thereof was coated with a protective UV cured resin.

10.49 mol % of $Al_2O_3$ was contained in the core. In the same way, 0.36 mol % of $Yb_2O_3$ and 14.96 mol % of $P_2O_5$ were also contained in the core. The diameter of the core was approximately 24 μm, and the relative refractive index difference (Δ) of the core was approximately 0.11%. A cladding NA which was obtained from a refractive index difference between the glass cladding guiding the pumping light and the polymer cladding confining the light was approximately 0.47.

There was substantially no sign of any loss increase which was caused by photodarkening in the obtained Yb-doped optical fiber. The loss increase measured using the aforementioned evaluation method was 0.01 dB or less.

Moreover, using the obtained Yb-doped optical fiber, a fiber laser was produced and its changes in optical output power over time were evaluated. As a result, it was found that in a pulse fiber laser having an initial output power of 22 W, a decrease in output power after a time lapse of 100 hours is 3% or less. This decrease in output power includes loss caused by factors such as changes in temperature and measurement uncertainty in addition to loss increase in the optical fiber. As a result, it was considered that the decrease in output power caused by loss increase from photodarkening was 1% or less.

The obtained Yb-doped optical fiber and the evaluation results for this fiber are shown in Table 2.

Example 8

Figure 9:
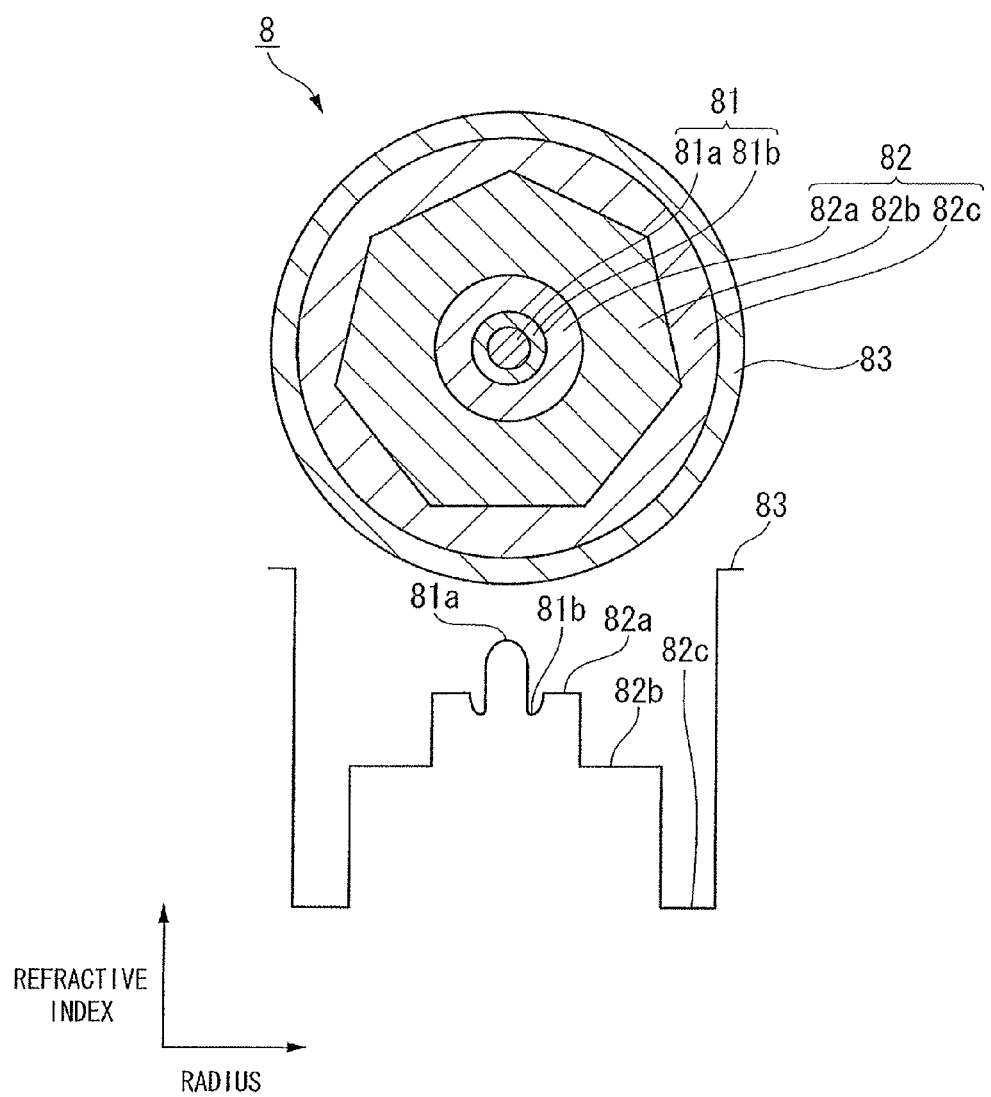
FIG. 9 is a view showing a cross section in the radial direction and a refractive index profile of an Yb-doped optical fiber manufactured according to Example 8 of the present invention.

An Yb-doped optical fiber having the structure shown in FIG. 9 was prepared. FIG. 9 shows a refractive index profile and a cross section in the radial direction of an Yb-doped optical fiber 8. The Yb-doped optical fiber 8 is a triple cladding fiber having a core 81 which has a two-layer structure and cladding 82 which has a three-layer structure. Namely, a ring groove 81b is provided on an outer circumference of a center core 81a, innermost cladding 82a is provided on an outer circumference of the ring groove 81b, intermediate cladding 82b is provided on an outer circumference of the innermost cladding 82a, outermost cladding 82c is provided on an outer circumference of the intermediate cladding 82b, and a protective coating layer 83 is provided on an outer circumference of the outermost cladding 82c. The intermediate cladding 82b has a substantially heptagonal-shaped cross-sectional configuration, and the center core 81a, the ring groove 81b, the innermost cladding 82a, the intermediate cladding 82b, and the outermost cladding 82c are provided concentrically.

A fiber preform was prepared using MCVD method. The Yb is doped using solution method. At this point, the outside of the circular column-shaped fiber preform was ground such that the cross-sectional configuration thereof was changed into a heptahedral-shaped configuration such as that shown in FIG. 9. The obtained fiber preform was then drawn until the diameter of a circumscribed circle of the cross section of the glass was approximately 420 μm. At this time, a polymer cladding material having a lower refractive index than that of the glass was coated onto the outer circumference of the glass and then cured so as to form a structure in which pumping light was confined in the glass cladding. In addition, the outer circumference thereof was coated with a protective UV cured resin.

11.03 mol % of $Al_2O_3$ was contained in the core. In the same way, 0.71 mol % of $Yb_2O_3$ and 14.43 mol % of $P_2O_5$ were also contained in the core. The diameter of the core was approximately 34 μm, and the relative refractive index difference (Δ) of the core was approximately 0.10%. A cladding NA which was obtained from a refractive index difference between the glass cladding guiding the pumping light and the polymer cladding confining the light was approximately 0.46.

There was substantially no sign of any loss increase which was caused by photodarkening in the obtained Yb-doped optical fiber. The loss increase measured using the aforementioned evaluation method was 0.01 dB or less.

Moreover, using the obtained Yb-doped optical fiber, a fiber laser was produced and its changes in optical output power over time were evaluated. As a result, it was found that in a pulse fiber laser having an initial output power of 50 W, a decrease in output power after a time lapse of 100 hours is 3% or less. This decrease in output power included loss caused by factors such as changes in temperature and measurement uncertainty in addition to loss increase in the optical fiber. Because of this, it was considered that the decrease in output power caused by loss increase from photodarkening was 1% or less.

The obtained Yb-doped optical fiber and the evaluation results for this fiber are shown in Table 2.

Example 9

Figure 10:
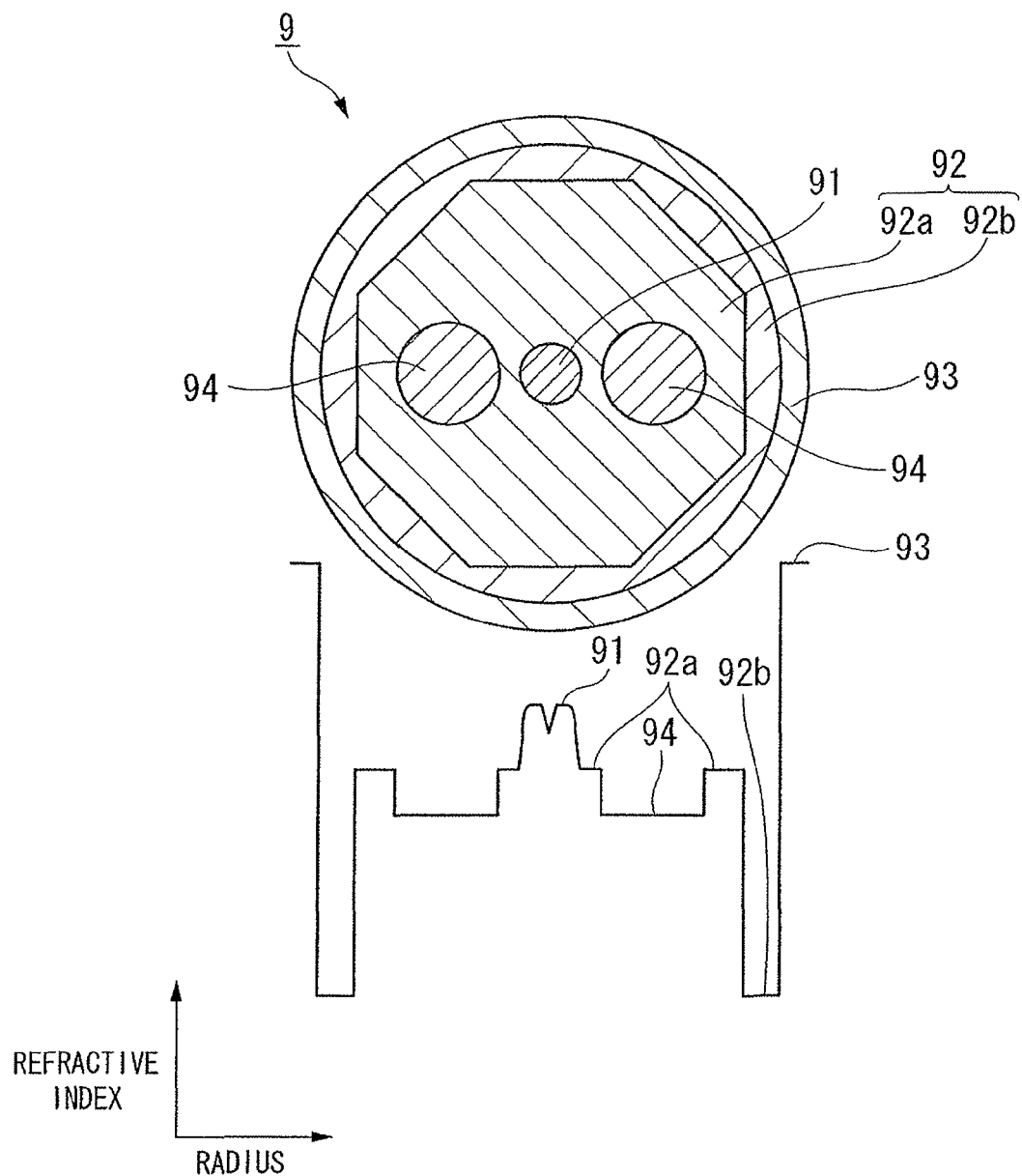
FIG. 10 is a view showing a cross section in the radial direction and a refractive index profile of an Yb-doped optical fiber manufactured according to Example 9 of the present invention.

An Yb-doped optical fiber having the structure shown in FIG. 10 was prepared. FIG. 10 shows a refractive index profile and a cross section in the radial direction of an Yb-doped optical fiber 9. The Yb-doped optical fiber 9 is a double cladding fiber having cladding 92 which has a two-layer structure. Inner side cladding 92a is provided on an outer circumference of a core 91, outer side cladding 92b is provided on an outer circumference of the inner side cladding 92a, and a protective coating layer 93 is provided on an outer circumference of the outer side cladding 92b. In addition, a pair of stress induced portions 94 and 94 is provided in the inner side cladding 92a at symmetrical positions relative to the core 91. Furthermore, the inner side cladding 92a has a substantially octahedral-shaped cross-sectional configuration, and the core 91, the inner side cladding 92a, and the outer side cladding 92b are provided concentrically.

In addition to Al, P, and Yb, the core was also doped with Ge and F. A fiber preform was prepared using MCVD method. The Yb is doped using solution method. At this point, the outside of the circular column-shaped fiber preform was ground such that the cross-sectional configuration thereof was changed into an octahedral-shaped configuration such as that shown in FIG. 10. A pair of holes is then formed so as to be positioned symmetrically relative to the core in the direction of the center axis of the fiber preform. Stress induced glass manufactured by adding boron or the like was then inserted into these holes. The obtained fiber preform was then drawn until the diameter of a circumscribed circle of the cross section of the glass was approximately 250 μm.

At this time, a polymer cladding material having a lower refractive index than that of the glass was coated onto the outer circumference of the glass and then cured so as to form a structure in which pumping light was confined in the glass cladding. In addition, the outer circumference thereof was coated with a protective UV cured resin.

As a result, polarization-maintaining optical fiber was obtained having 1.72 mol % of $Al_2O_3$, 0.26 mol % of $Yb_2O_3$, 2.35 mol % of $P_2O_5$, 0.83 mol % of $GeO_2$, and 0.35 mol % of F contained in the core. The diameter of the core was approximately 9.3 μm, and the relative refractive index difference (Δ) of the core was approximately 0.22%. A cladding NA which was obtained from a refractive index difference between the glass cladding guiding the pumping light and the polymer cladding confining the light was approximately 0.46.

There was substantially no sign of any loss increase which was caused by photodarkening in the obtained Yb-doped optical fiber. The loss increase measured using the aforementioned evaluation method was 0.01 dB or less.

Moreover, using the obtained Yb-doped optical fiber, a fiber laser was produced and its changes in optical output power over time were evaluated. As a result, it was found that in a pulse fiber laser having an initial output power of 11.3 W, a decrease in output power after a time lapse of 100 hours is 1% or less. This decrease in output power included loss caused by factors such as changes in temperature and measurement uncertainty in addition to loss increase in the optical fiber. Because of this, it was considered that there was substantially no decrease in output power caused by loss increase from photodarkening.

Moreover, a grating structure was formed by excimer laser exposure in the obtained Yb-doped optical fiber. As a result, fiber gratings having a reflectance of 100%, 10%, and 4% for light of a wavelength of 1064 nm were prepared respectively, and it was confirmed that the reflectance can be adjusted to the designed level.

The obtained Yb-doped optical fiber and the evaluation results for this fiber are shown in Table 2.

Experiments 10-26, Comparative Examples 1-2

The Yb-doped optical fibers shown in Tables 2 to 5 were prepared using the same procedure as that in Examples 1 to 9, and the loss increases caused by photodarkening were evaluated. The configurations (shape) of the core and cladding of a cross section in the radial direction of the respective Yb-doped optical fibers were as is described below.

Example 10; cross-sectional configuration is the same as in FIG. 6.
Example 11; cross-sectional configuration is the same as in FIG. 6.
Example 12; cross-sectional configuration is the same as in FIG. 1.
Example 13; cross-sectional configuration is the same as in FIG. 5.
Example 14; cross-sectional configuration is the same as in FIG. 6.
Example 15; cross-sectional configuration is the same as in FIG. 7.
Example 16; cross-sectional configuration is the same as in FIG. 8.
Example 17; cross-sectional configuration is the same as in FIG. 6.
Example 18; cross-sectional configuration is the same as in FIG. 9.
Example 19; cross-sectional configuration is the same as in FIG. 9.
Example 20; cross-sectional configuration is the same as in FIG. 7.
Example 21; cross-sectional configuration is the same as in FIG. 3.
Example 22; cross-sectional configuration is the same as in FIG. 6.
Example 23; cross-sectional configuration is the same as in FIG. 5.
Example 24; cross-sectional configuration is the same as in FIG. 7.
Example 25; cross-sectional configuration is the same as in FIG. 5.
Example 26; cross-sectional configuration is the same as in FIG. 1.
Comparative example 1; cross-sectional configuration is the same as in FIG. 1.
Comparative example 2; cross-sectional configuration is the same as in FIG. 1.

The Yb-doped optical fiber of Comparative example 1 contains Ge in the core but does not contain P therein. Excepting this, it is the same as in the Examples. For example, it has substantially the same initial optical amplification properties as the Yb-doped optical fibers of the Examples in which the refractive index and Yb concentration and the like are substantially equal.

Figure 11:
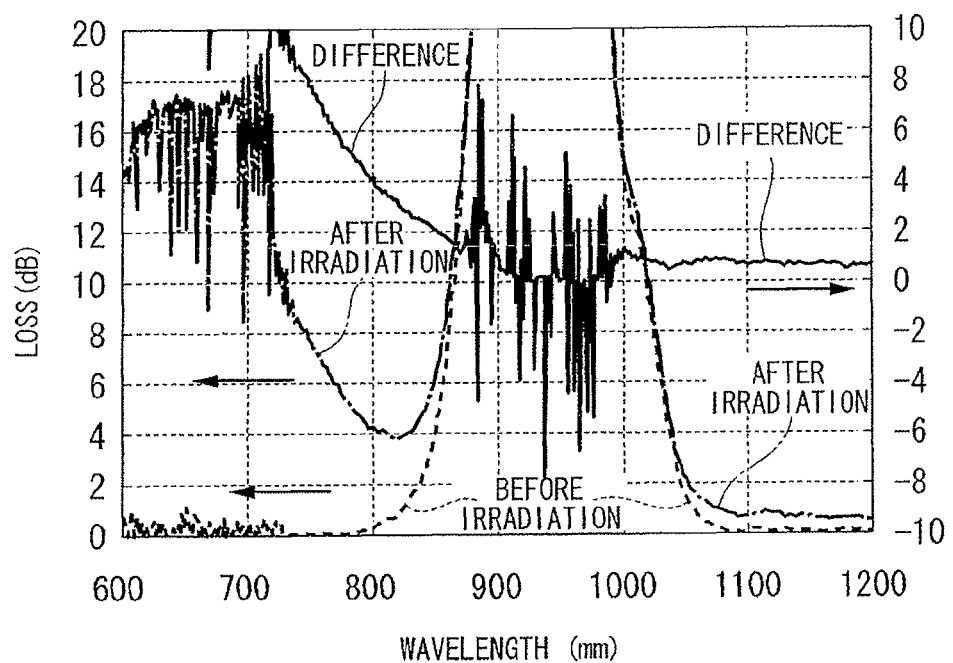
FIG. 11 is a graph showing a relationship between loss before and after an irradiation of pumping light and a wavelength dependence of a loss increase after the irradiation thereof in Comparative example 1.

A relationship between the loss before and after the irradiation of pumping light and the wavelength dependence of loss increase in Comparative example 1 is shown as a graph in FIG. 11. From FIG. 11 it was possible to confirm that there was a loss increase which was a monotonically increase to the short wavelength side after the pumping light irradiation. In FIG. 11, the reason why noise can be seen in the loss data around the 1000 nm wavelength is the same as in FIG. 2, namely, because an Yb absorption band exists in this wavelength band.

The Yb-doped optical fiber of Comparative example 2 has a $P_2O_5$ equivalent concentration in the core which is lower than the $Al_2O_3$ equivalent concentration therein. Excepting this, it is the same as in the Examples. In addition, as is clear from Table 5, it was conformed that the Yb-doped optical fiber of Comparative example 2 did not exhibit sufficient loss increase suppression.

TABLE 1

|  | Example 1 | Example 2 | Example 3 | Example 4 | Example 5 | Example 6 |
|---|---|---|---|---|---|---|
| $Al_2O_3$ concentration (mol %) | 1.67 | 0.84 | 0.80 | 0.92 | 5.32 | 0.78 |
| $Yb_2O_3$ concentration (mol %) | 0.54 | 0.15 | 0.17 | 0.19 | 0.33 | 0.14 |
| $P_2O_5$ concentration (mol %) | 8.37 | 3.80 | 3.53 | 2.09 | 6.86 | 1.85 |
| $P_2O_5$ concentration/ $Al_2O_3$ concentration | 5.01 | 4.52 | 4.41 | 2.27 | 1.29 | 2.37 |

TABLE 1-continued

|  | Example 1 | Example 2 | Example 3 | Example 4 | Example 5 | Example 6 |
|---|---|---|---|---|---|---|
| $P_2O_5$ concentration/($Yb_2O_3$ concentration + $Al_2O_3$ concentration) | 3.79 | 3.84 | 3.64 | 1.88 | 1.21 | 2.01 |
| $Yb_2O_3$ concentration/$Al_2O_3$ concentration | 0.32 | 0.18 | 0.21 | .021 | 0.06 | 0.18 |
| Other content elements (concentration, mol %) | — | — | — | — | — | — |
| Relative refractive index difference of core (%) | 0.64 | 0.25 | 0.15 | 0.10 | 0.15 | 0.09 |
| Core diameter (μm) | 4.9 | 7.0 | 10.3 | 18.7 | 10.3 | 35 |
| Cladding structure | Single | Single | Single | Double | Double | Double |
| Glass cladding (circumscribed circle) diameter (μm) | 125 | 125 | 125 | 250 | 125 | 400 |
| Photodarkening loss increase (dB) | ≤0.01 | ≤0.01 | ≤0.01 | ≤0.01 | ≤0.01 | ≤0.01 |

TABLE 2

|  | Example 7 | Example 8 | Example 9 | Example 10 | Example 11 | Example 12 |
|---|---|---|---|---|---|---|
| $Al_2O_3$ concentration (mol %) | 10.49 | 11.03 | 1.72 | 0.23 | 11.82 | 4.25 |
| $Yb_2O_3$ concentration (mol %) | 0.36 | .071 | 0.26 | 0.15 | 0.72 | 0.51 |
| $P_2O_5$ concentration (mol %) | 14.96 | 14.43 | 2.35 | 2.46 | 13.82 | 5.02 |
| $P_2O_5$ concentration/$Al_2O_3$ concentration | 1.43 | 1.31 | 1.37 | 10.70 | 1.17 | 1.18 |
| $P_2O_5$ concentration/($Yb_2O_3$ concentration + $Al_2O_3$ concentration) | 1.38 | 1.23 | 1.19 | 6.47 | 1.10 | 1.05 |
| $Yb_2O_3$ concentration/$Al_2O_3$ concentration | 0.03 | 0.06 | 0.15 | 0.65 | 0.06 | 0.12 |
| Other content elements (concentration, mol %) | — | — | $GeO_2$ (0.83) F (0.35) | — | — | — |
| Relative refractive index difference of core (%) | 0.11 | 0.10 | 0.22 | 0.20 | 0.43 | 0.27 |
| Core diameter (μm) | 24 | 34 | 9.3 | 9.6 | 6.5 | 8.8 |
| Cladding structure | Triple | Triple | Double | Double | Double | Single |
| Glass cladding (circumscribed circle) diameter (μm) | 380 | 420 | 250 | 250 | 125 | 125 |
| Photodarkening loss increase (dB) | ≤0.01 | ≤0.01 | ≤0.01 | ≤0.01 | ≤0.01 | ≤0.01 |

TABLE 3

|  | Example 13 | Example 14 | Example 15 | Example 16 | Example 17 | Example 18 |
|---|---|---|---|---|---|---|
| $Al_2O_3$ concentration (mol %) | 9.81 | 0.34 | 0.43 | 10.26 | 10.91 | 4.79 |
| $Yb_2O_3$ concentration (mol %) | 0.11 | 0.68 | 0.01 | 0.99 | 0.22 | 0.35 |
| $P_2O_5$ concentration (mol %) | 14.82 | 6.32 | 4.83 | 13.21 | 19.83 | 4.89 |
| $P_2O_5$ concentration/$Al_2O_3$ concentration | 1.51 | 18.59 | 11.23 | 1.29 | 1.82 | 1.02 |
| $P_2O_5$ concentration/($Yb_2O_3$ concentration + $Al_2O_3$ concentration) | 1.49 | 6.20 | 10.98 | 1.17 | 1.78 | 0.95 |

TABLE 3-continued

|  | Example 13 | Example 14 | Example 15 | Example 16 | Example 17 | Example 18 |
|---|---|---|---|---|---|---|
| $Yb_2O_3$ concentration/ $Al_2O_3$ concentration | 0.01 | 2.00 | 0.02 | 0.10 | 0.02 | 0.07 |
| Other content elements (concentration, mol %) | — | — | — | — | — | — |
| Relative refractive index difference of core (%) | 0.35 | 0.65 | 0.27 | 0.22 | 0.61 | 0.15 |
| Core diameter (μm) | 6.8 | 4.7 | 8.7 | 15.8 | 4.9 | 13.8 |
| Cladding structure | Double | Double | Double | Triple | Double | Triple |
| Glass cladding (circumscribed circle) diameter (μm) | 180 | 125 | 400 | 250 | 125 | 360 |
| Photodarkening loss increase (dB) | ≤0.01 | ≤0.01 | ≤0.01 | ≤0.01 | ≤0.01 | ≤0.01 |

TABLE 4

|  | Example 19 | Example 20 | Example 21 | Example 22 | Example 23 | Example 24 |
|---|---|---|---|---|---|---|
| $Al_2O_3$ concentration (mol %) | 2.38 | 1.81 | 1.67 | 0.84 | 1.62 | 3.81 |
| $Yb_2O_3$ concentration (mol %) | 0.63 | 0.09 | 0.54 | 0.15 | 0.35 | 0.25 |
| $P_2O_5$ concentration (mol %) | 4.96 | 2.63 | 8.37 | 3.82 | 2.21 | 5.53 |
| $P_2O_5$ concentration/ $Al_2O_3$ concentration | 2.08 | 1.45 | 5.01 | 4.55 | 1.36 | 1.451 |
| $P_2O_5$ concentration/($Yb_2O_3$ concentration + $Al_2O_3$ concentration) | 1.65 | 1.38 | 3.79 | 3.86 | 1.12 | 1.362 |
| $Yb_2O_3$ concentration/ $Al_2O_3$ concentration | 0.26 | 0.05 | 0.32 | 0.18 | 0.22 | 0.066 |
| Other content elements (concentration, mol %) | — | — | — | — | $GeO_2$ (0.83) | F (0.45) |
| Relative refractive index difference of core (%) | 0.13 | 0.05 | 0.65 | 0.25 | 0.29 | 0.11 |
| Core diameter (μm) | 30 | 40 | 4.7 | 9.2 | 7.2 | 24 |
| Cladding structure | Triple | Double | Single | Double | Double | Double |
| Glass cladding (circumscribed circle) diameter (μm) | 400 | 400 | 125 | 250 | 125 | 400 |
| Photodarkening loss increase (dB) | ≤0.01 | ≤0.01 | ≤0.01 | ≤0.01 | ≤0.01 | ≤0.01 |

TABLE 5

|  | Example 25 | Example 26 | Comparative example 1 | Comparative example 2 |
|---|---|---|---|---|
| $Al_2O_3$ concentration (mol %) | 3.68 | 6.23 | 0.20 | 3.50 |
| $Yb_2O_3$ concentration (mol %) | 0.58 | 0.17 | 0.51 | 0.27 |
| $P_2O_5$ concentration (mol %) | 7.82 | 7.81 | 0 | 0.12 |
| $P_2O_5$ concentration/ $Al_2O_3$ concentration | 2.125 | 1.25 | 0 | 0.03 |
| $P_2O_5$ concentration/($Yb_2O_3$ concentration + $Al_2O_3$ concentration) | 1.836 | 1.22 | 0 | 0.03 |
| $Yb_2O_3$ concentration/ $Al_2O_3$ concentration | 0.158 | 0.03 | 2.55 | 0.08 |
| Other content elements (concentration, mol %) | $B_2O_3$ (0.13) | $Er_2O_3$ (0.10) | $GeO_2$ (0.83) | — |
| Relative refractive index difference of core (%) | 0.26 | 0.35 | 0.64 | 0.43 |
| Core diameter (μm) | 8.0 | 6.8 | 4.9 | 6.8 |
| Cladding structure | Double | Single | Single | Single |
| Glass cladding (circumscribed circle) | 250 | 125 | 125 | 125 |

TABLE 5-continued

| | Example 25 | Example 26 | Comparative example 1 | Comparative example 2 |
|---|---|---|---|---|
| diameter (μm) | | | | |
| Photodarkening loss increase (dB) | ≤0.01 | ≤0.01 | 13.8 | 7.6 |

INDUSTRIAL APPLICABILITY

The present invention can be used as a high output light source laser medium for material processing applications such as welding, marking, cutting and the like.

DESCRIPTION OF THE REFERENCE NUMERALS 1, 2, 3, 4, 5, 6, 7, 8, 9 Ytterbium-doped optical fiber
11, 21, 31, 41, 51, 61, 71, 81, 91 Core
12, 22, 32, 42, 52, 62, 72, 82, 92 Cladding
42a, 52a, 62a, 92a Inner side cladding
42b, 52b, 62b, 92b Outer side cladding
72a, 82a Innermost cladding
72b, 82b Intermediate cladding
72c, 82c Outermost cladding

The invention claimed is:

1. An ytterbium-doped optical fiber comprising:
a core which consists of ytterbium, aluminum, phosphorus, fluorine, and at least one element selected from a group consisting of transition metal elements and rare earth elements other than ytterbium and erbium; and
a cladding which encircles the core, wherein
an aluminum oxide equivalent concentration of the aluminum in the core is 0.2 mol % or more;
a diphosphorus pentaoxide equivalent concentration of the phosphorus is higher than the aluminum oxide equivalent concentration; and
the core either does not contain germanium or contains less than 1.1 mol % of germanium in a germanium dioxide equivalent concentration,
wherein the diphosphorous pentaoxide equivalent concentration in the core is greater than a summation of an ytterbium oxide equivalent concentration of the ytterbium and the aluminum oxide equivalent concentration in the core, and the ytterbium oxide equivalent concentration in the core is in a range of 0.01 to 1.0 mol %.

2. The ytterbium-doped optical fiber according to claim 1, wherein
the core and the cladding are formed from silica glass.

3. The ytterbium-doped optical fiber according to claim 1, wherein
a ratio between an ytterbium oxide equivalent concentration and the aluminum oxide equivalent concentration in the core is in a range of 0.01 to 2.

4. The ytterbium-doped optical fiber according to claim 1, wherein
the diphosphorus pentaoxide equivalent concentration in the core is 20 mol % or less.

5. The ytterbium-doped optical fiber according to claim 1, wherein
the diphosphorus pentaoxide equivalent concentration is not more than twice the aluminum oxide equivalent concentration in the core.

6. The ytterbium-doped optical fiber according to claim 1, wherein
a relative refractive index difference between the core and the cladding is in a range of 0.05 to 0.65%.

7. The ytterbium-doped optical fiber according to claim 6, wherein
the relative refractive index difference between the core and the cladding is in a range of 0.05 to 0.25%.

8. The ytterbium-doped optical fiber according to claim 1, wherein
the core further contains fluorine.

9. The ytterbium-doped optical fiber according to claim 1, wherein
the core further contains at least one element selected from a group consists of transition metal elements other than ytterbium.

10. The ytterbium-doped optical fiber according to claim 1, wherein
at least two layers of cladding are provided; and
a refractive index of the cladding on an inner side in a radial direction is higher than a refractive index of the cladding on an outer side in the radial direction.

11. The ytterbium-doped optical fiber according to claim 10, wherein
at least three layers of cladding are provided; and
a refractive index nc1 of the cladding on an innermost side in the radial direction, a refractive index nc3 of the cladding on an outermost side in the radial direction, and a refractive index nc2 of an intermediate cladding between the innermost cladding and the outermost cladding satisfy a relationship of nc1>nc2>nc3.

12. A fiber laser comprising the ytterbium-doped optical fiber according to claim 1 as an optical amplifying medium.

13. A fiber amplifier comprising the ytterbium-doped optical fiber according to claim 1 as an optical amplifying medium.

* * * * *

UNITED STATES PATENT AND TRADEMARK OFFICE
CERTIFICATE OF CORRECTION

| | | |
|---|---|---|
| PATENT NO. | : 8,941,912 B2 | Page 1 of 1 |
| APPLICATION NO. | : 13/020604 | |
| DATED | : January 27, 2015 | |
| INVENTOR(S) | : Shoji Tanigawa et al. | |

It is certified that error appears in the above-identified patent and that said Letters Patent is hereby corrected as shown below:

In the Claims

In claim 1, at column 25, lines 28-32:

Delete "a core which consists of ytterbium, aluminum, phosphorus, fluorine, and at least one element selected from a group consisting of transition metal elements and rare earth elements other than ytterbium and erbium" and insert -- a core which contains at least ytterbium, aluminum, and phosphorus --

In claim 1, at column 25, line 39:

Delete "and"

In claim 1, at column 25, lines 40-42:

Delete "the core either does not contain germanium or contains less than 1.1 mol% of germanium in a germanium dioxide equivalent concentration" and insert -- the core either does not contain germanium or contains less than 1.1 mol% of germanium in a germanium dioxide equivalent concentration, and the core does not contain boron and rare earth elements other than ytterbium --

In claim 9, at column 26, line 29:

Delete "consists" and insert -- consisting --

Signed and Sealed this
Fifteenth Day of September, 2015

Michelle K. Lee
*Director of the United States Patent and Trademark Office*